US011930130B2

(12) United States Patent
Zhou

(10) Patent No.: US 11,930,130 B2
(45) Date of Patent: Mar. 12, 2024

(54) SCREENSHOT GENERATING METHOD, CONTROL METHOD, AND ELECTRONIC DEVICE

(71) Applicant: Huawei Technologies Co., Ltd., Shenzhen (CN)

(72) Inventor: Shanru Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 527 days.

(21) Appl. No.: 17/281,172

(22) PCT Filed: Sep. 25, 2019

(86) PCT No.: PCT/CN2019/107632
§ 371 (c)(1),
(2) Date: Mar. 29, 2021

(87) PCT Pub. No.: WO2020/063605
PCT Pub. Date: Apr. 2, 2020

(65) Prior Publication Data
US 2022/0030105 A1    Jan. 27, 2022

(30) Foreign Application Priority Data

Sep. 30, 2018    (CN) .......................... 201811163141.X

(51) Int. Cl.
*G06F 3/048* (2013.01)
*H04M 1/72469* (2021.01)

(52) U.S. Cl.
CPC .... *H04M 1/72469* (2021.01); *H04M 2250/52* (2013.01)

(58) Field of Classification Search
CPC ......... H04M 1/72469; H04M 2250/52; H04M 1/724; H04M 1/0264; H04M 1/0266;
(Continued)

(56) References Cited

U.S. PATENT DOCUMENTS 9,164,657 B2    10/2015 Mulloy et al.
2005/0083642 A1    4/2005 Senpuku et al.
(Continued)

FOREIGN PATENT DOCUMENTS

CN    102968244 A    3/2013
CN    104133683 A    11/2014
(Continued)

OTHER PUBLICATIONS

ITU-T H.264, "Series H: Audiovisual and Multimedia Systems, Infrastructure of audiovisual services-Coding of moving video, Advanced video coding for generic audiovisual services," Apr. 2017, 812 pages.

*Primary Examiner* — Rashawn N Tillery
(74) *Attorney, Agent, or Firm* — Conley Rose, P.C.

(57) ABSTRACT

An electronic device includes a display and a camera. A through hole is provided in the display, and the camera is embedded in the through hole. The electronic device displays an interface of the first application program, receives a screen capturing operation from a user, draws a screenshot of the interface of the first application program in response to the screen capturing operation, adds an image corresponding to the first application program to a position that is in the screenshot of the interface of the first application program and that corresponds to the through hole, and displays the screenshot that includes the image corresponding to the first application program.

20 Claims, 23 Drawing Sheets

(58) Field of Classification Search
CPC .............. H04M 1/72439; G06F 1/1686; G06F 3/04817; G06F 3/0482
See application file for complete search history.

(56) References Cited

U.S. PATENT DOCUMENTS

| | | | |
|---|---|---|---|
| 2007/0223024 | A1 | 9/2007 | Takesada |
| 2012/0189282 | A1 | 7/2012 | Wyatt et al. |
| 2014/0207452 | A1 | 7/2014 | Klein et al. |
| 2016/0139777 | A1 | 5/2016 | Pinho et al. |
| 2017/0195550 | A1* | 7/2017 | Kim ................ G06F 3/0483 |
| 2018/0017996 | A1 | 1/2018 | Ryu et al. |
| 2018/0219993 | A1 | 8/2018 | Mian et al. |
| 2020/0257433 | A1 | 8/2020 | Zha |
| 2021/0397320 | A1* | 12/2021 | Ye .................... G06F 3/0448 |

FOREIGN PATENT DOCUMENTS

| | | | | |
|---|---|---|---|---|
| CN | 104504083 | A | | 4/2015 |
| CN | 106201275 | A * | | 12/2016 |
| CN | 106708390 | A | | 5/2017 |
| CN | 106973157 | A | | 7/2017 |
| CN | 107219973 | A | | 9/2017 |
| CN | 107219973 | A * | 9/2017 | ......... G06F 3/04817 |
| CN | 107291355 | A | | 10/2017 |
| CN | 107357505 | A | | 11/2017 |
| CN | 107580143 | A | | 1/2018 |
| CN | 107861681 | A * | 3/2018 | ........... G06F 3/0485 |
| CN | 108052251 | A | | 5/2018 |
| CN | 108279843 | A | | 7/2018 |
| CN | 108427526 | A | | 8/2018 |
| CN | 109274828 | A | | 1/2019 |
| CN | 110231900 | A * | 9/2019 | ......... G06F 3/04817 |
| CN | 110262108 | A * | 9/2019 | ........... G02F 1/1333 |
| EP | 2867767 | A4 | | 3/2016 |
| EP | 3846427 | A1 | | 7/2021 |
| KR | 20130027335 | A | | 3/2013 |
| WO | 2014004382 | A1 | | 1/2014 |
| WO | 2016078779 | A1 | | 5/2016 |
| WO | WO-2020087504 | A1 * | | 5/2020 |

\* cited by examiner

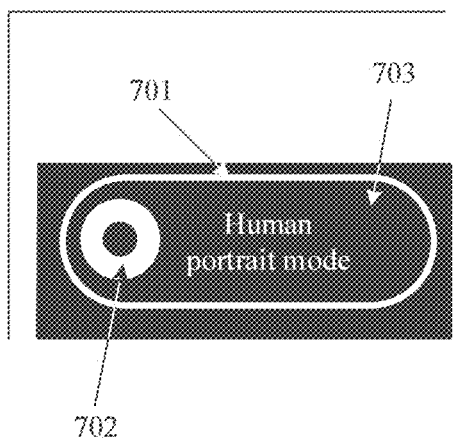

FIG. 7(b)

| |
|---|
| An electronic device displays a first interface on a display, where the first interface includes a first interface element, a display position of the first interface element encircles a through hole provided in the display, and the through hole is configured to accommodate hardware such as a camera — S801 |
| The electronic device receives a first operation of making, by a user, a phone call — S802 |
| The electronic device displays a call interface on the display in response to the first operation, where the call interface includes the first interface element — S803 |
| The electronic device receives a second operation performed by the user — S804 |
| The electronic device displays a second interface on the display in response to the second operation, where the second interface is different from the call interface, the second interface includes a second interface element, the second interface element includes prompt information used to prompt that the electronic device is currently in a call or prompt call duration, a display position of the second interface element encircles the through hole disposed in the display, and a display area of the second interface element is greater than a display area of the first interface element — S805 |

FIG. 8

SCREENSHOT GENERATING METHOD, CONTROL METHOD, AND ELECTRONIC DEVICE

CROSS-REFERENCE TO RELATED APPLICATIONS

This application is a U.S. National Stage of International Patent Application No. PCT/CN2019/107632 filed on Sep. 25, 2019, which claims priority to Chinese Patent Application No. 201811163141.X filed on Sep. 30, 2018, both of which are hereby incorporated by reference in their entireties.

TECHNICAL FIELD

This application relates to the field of electronic devices, and in particular, to a screenshot generating method, a control method, and an electronic device.

BACKGROUND

Nowadays, the mobile phone has become a necessary communications tool in people's daily life and work. By using the mobile phone, a user may not only communicate with another user, but also browse or process various information. In a use process, for interesting content displayed in the mobile phone, for example, if the user is interested in content in an interface of an application program displayed in the mobile phone, the user usually uses a screen capturing function to store the content in a form of a screenshot, for ease of subsequent use. However, a volume of information included in the screenshot is usually very limited, resulting in low intelligence of human-computer interaction.

SUMMARY

Embodiments of this application provide a screenshot generating method, a control method, and an electronic device, so that problems of a limited volume of information included in a screenshot and low intelligence of human-computer interaction are resolved.

To achieve the foregoing objective, the following technical solutions are used in the embodiments of this application.

According to a first aspect of the embodiments of this application, a screenshot generating method is provided. The method may be applied to an electronic device, where the electronic device may include a display and a camera, a through hole is provided in the display, and the camera is embedded in the through hole. The method may include: displaying, by the electronic device, a home screen on the display, where the home screen may include an icon of a first application program; receiving, by the electronic device, an operation performed by a user on the icon of the first application program; displaying, by the electronic device, an interface of the first application program on the display, in response to the operation performed by the user on the icon of the first application program; receiving, by the electronic device, a screen capturing operation performed by the user; drawing, by the electronic device, a screenshot of the interface of the first application program in response to the screen capturing operation, and automatically adding an image corresponding to the first application program to a position that is in the screenshot of the interface of the first application program and that corresponds to the through hole; and displaying, by the electronic device, the screenshot that includes the image corresponding to the first application program.

According to the screenshot generating method provided in the embodiments of this application, after receiving the screen capturing operation performed by the user, the electronic device automatically adds an image corresponding to a related application program to the position that corresponds to the through hole provided in the display and that is in the drawn screenshot. The user who views the screenshot can obtain, without a related context, more current system information when capturing the screen, for example, an application program run when the screen is captured. A volume of information included in the screenshot is increased, so that interaction efficiency is improved, and intelligence of human-computer interaction is increased.

With reference to the first aspect, in a possible implementation, the foregoing home screen may further include an icon of a second application program. The screenshot generating method may further include: receiving, by the electronic device, an operation performed by the user on the icon of the second application program; displaying, by the electronic device, an interface of the second application program on the display; in response to the operation performed by the user on the icon of the second application program; receiving, by the electronic device, the screen capturing operation performed by the user; drawing, by the electronic device, a screenshot of the interface of the second application program in response to the screen capturing operation, and automatically adding an image corresponding to the second application program to a position that is in the screenshot of the interface of the second application program and that corresponds to the through hole; and displaying, by the electronic device, the screenshot that includes the image corresponding to the second application program. In this way, images corresponding to different application programs are added to the drawn screenshots based on different application programs run in the system when the screen is captured, so that the screenshots can better reflect current information of the system when the screen is captured, and intelligence of human-computer interaction is further increased.

According to a second aspect of the embodiments of this application, a control method is provided. The control method may be applied to an electronic device, where the electronic device may include a display and a camera, a through hole is provided in the display, and the camera is embedded in the through hole. The method may include: displaying, by the electronic device, a first interface on the display, where the first interface may include a first interface element, and a display position of the first interface element encircles the through hole; receiving, by the electronic device, a first operation performed by a user; displaying, by the electronic device, a second interface on the display in response to the first operation, where the second interface includes the first interface element, and the second interface is an interface of a first application program; receiving, by the electronic device, a second operation of enabling, by the user, a first mode of the first application program; and enabling, by the electronic device, the first mode in response to the second operation, displaying a second interface element on the second interface, and skipping displaying the first interface element, where the second interface element includes first prompt information used to prompt that the first mode is enabled, a display position of the second interface element encircles the through hole, and a display area of the second interface element is greater than a display area of the first interface element.

According to the control method provided in the embodiments of this application, an interface element included in an interface displayed on the display is associated with hardware (for example, the camera) disposed in the through hole of the display, so that the abruptness of the hardware that is disposed in the through hole of the display and that is in the interface displayed on the display is alleviated. In addition, the electronic device can change, based on a current set mode of the first application program, the interface element associated with the camera, and the changed interface element can prompt the current status of the electronic device to the user. In a manner of prompting, beside the camera, the current status of the electronic device, the interface element can better prompt the current status of the electronic device to the user, and prompting efficiency is improved, so that the user learns of the current status of the electronic device more intuitively and quickly, and the intelligence of human-computer interaction is increased.

With reference to the second aspect, in a possible implementation, the foregoing first application program may be Camera in the electronic device; and the first mode may be a photographing mode, a video recording mode, or a scene mode of Camera. In this way, when the first application program is Camera, because prompted content is related to a current status of the hardware camera, a manner of performing prompting beside the camera can further improve prompting efficiency, so that the user learns of the current working status of the camera more intuitively and quickly, and the intelligence of human-computer interaction is further increased, thereby improving use experience of the user.

With reference to the second aspect or the foregoing possible implementation, in another possible implementation, the displaying a second interface element on the second interface, and skipping displaying the first interface element may specifically include: changing, by the electronic device based on a scene transition effect, the first interface element displayed in the second interface to the second interface element. The scene transition effect may be pre-defined, and the electronic device may also provide an entry for user setting. In this way, the interface element can better prompt a current status of the electronic device to the user, thereby further improving user experience.

With reference to the second aspect or the foregoing possible implementations, in another possible implementation, the control method may further include: receiving, by the electronic device, a third operation of making, by the user, a phone call; displaying, by the electronic device, a call interface on the display in response to the third operation, where the call interface may include the first interface element; receiving, by the electronic device, a fourth operation performed by the user; and displaying, by the electronic device, a third interface on the display in response to the fourth operation, where the third interface is different from the call interface, the third interface may include a third interface element, the third interface element includes second prompt information, the second prompt information may be used to prompt that the electronic device is currently in a call or prompt call duration, a display position of the third interface element encircles the through hole provided in the display, and a display area of the third interface element may be greater than the display area of the first interface element. In this way, the electronic device prompts, by using the interface element associated with the camera, that the electronic device is currently in a call, thereby further improving prompting efficiency and further improving intelligence of human-computer interaction.

With reference to the second aspect or the foregoing possible implementations, in another possible implementation, the third interface may be a home screen or an interface of an application program; and the third interface element is included in a status bar of the third interface.

With reference to the second aspect or the foregoing possible implementations, in another possible implementation, the first interface element and the second interface element are included in a status bar.

With reference to the second aspect or the foregoing possible implementations, in another possible implementation, after the displaying, by the electronic device, a first interface on the display, the control method may further include: receiving, by the electronic device, a screen capturing operation performed by the user; drawing, by the electronic device, a screenshot of the first interface in response to the screen capturing operation, and automatically adding a watermark to a position that is in the screenshot of the first interface and that corresponds to the through hole; and displaying, by the electronic device, the screenshot that includes the watermark. In this way, by automatically adding the watermark to the position that corresponds to the through hole provided in the display and that is in the drawn screenshot, intelligence of human-computer interaction is improved.

With reference to the second aspect or the foregoing possible implementations, in another possible implementation, after the enabling, by the electronic device, the first mode in response to the second operation, displaying a second interlace element on the second interface, and skipping displaying the first interface element, the method may further include: receiving, by the electronic device, the screen capturing operation performed by the user; drawing, by the electronic device, a screenshot of the second interface in response to the screen capturing operation, and automatically adding an image corresponding to the first application program to a position that is in the screenshot of the second interface and that corresponds to the through hole; and displaying, by the electronic device, the screenshot that includes the image corresponding to the first application program. In this way, the image corresponding to a related application program is automatically added to the position that corresponds to the through hole provided in the display and that is in the drawn screenshot. The user who view s the screenshot can obtain, without a related context, more current system information when the screen is captured, for example, an application program run when the screen is captured. A volume of information included in the screenshot is increased, so that interaction efficiency is improved, and intelligence of human-computer interaction is increased.

According to a third aspect of the embodiments of this application, a control method is provided, applied to an electronic device, where the electronic device may include a display and a camera, a through hole is provided in the display, and the camera is embedded in the through hole. The method may include: displaying, by the electronic device, a first interface on the display, where the first interface includes a first interface element, and a display position of the first interface element may encircle the through hole provided in the display; receiving, by the electronic device, a first operation of making, by a user, a phone call; displaying, by the electronic device, a call interface on the display in response to live first operation, where the call interface may include the first interface element; receiving, by the electronic device, a second operation performed by the user; and displaying, by the electronic device on the display, a second interface different from the call interface in response to the second operation, where the second interface may include a second interface element, the second interface element includes prompt information, the prompt information may be used to prompt that the electronic device is currently in a call or prompt call duration, a display position of the second interface element may encircle the through hole provided in the display, and a display area of the second interface element is greater than a display area of the first interface element.

According to the control method provided in the embodiments of this application, an interface element included in an interface displayed on the display is associated with hardware (for example, the camera) disposed in the through hole of the display, so that the abruptness of the hardware that is disposed in the through hole of the display and that is in the interface displayed on the display is alleviated. In addition, the electronic device can change the interface element associated with the camera, and the changed interface element can be used to prompt the user that the electronic device is currently in a call. A manner of performing prompting beside the camera can improve prompting efficiency, so that the user more intuitively and quickly learns that the electronic device is currently in a call, the intelligence of human-computer interaction is increased, and use experience of the user is improved.

With reference to the third aspect, in a possible implementation, the second interface is a home screen or an interface of an application program; and the first interface element and the second interface element are included in a status bar.

With reference to the third aspect or the foregoing possible implementation, in another possible implementation, after the displaying, by the electronic device, a second interface on the display in response to the second operation, the method may further include: receiving, by the electronic device, a screen capturing operation performed by the user; drawing, by the electronic device, a screenshot of the second interface in response to the screen capturing operation, and automatically adding an image corresponding to Phone to a position that is in the screenshot of the second interface and that corresponds to the through hole; and displaying, by the electronic device, the screenshot that includes the image corresponding to Phone. In this way, the image corresponding to Phone is automatically added to the position that corresponds to the through hole provided in the display and that is in the drawn screenshot. The user who views the screenshot can obtain, without a related context, more current system information when the screen is captured, for example, a call is made when the screen is captured. A volume of information included in the screenshot is increased, so that interaction efficiency is improved, and intelligence of human-computer interaction is increased.

According to a fourth aspect of the embodiments of this application, an electronic device is provided, where the electronic device may include a display and a camera, a through hole is provided in the display, and the camera is embedded in the through hole. The electronic device may include a display unit, an input unit, and a processing unit; the display unit is configured to display a home screen on the display, where the home screen includes an icon of a first application program; the input unit is configured to receive an operation performed by a user on the icon of the first application program; the display unit is further configured to display an interface of the first application program on the display in response to the operation performed by the user on the icon of the first application program; the input unit is further configured to receive a screen capturing operation performed by the user; the processing unit is configured to: draw a screenshot of the interface of the first application program in response to the screen capturing operation, and automatically add an image corresponding to the first application program to a position that is in the screenshot of the interface of the first application program and that corresponds to the through hole; and the display unit is further configured to display the screenshot that includes the image corresponding to the first application program.

With reference to the fourth aspect, in a possible implementation, the foregoing home screen may further include an icon of a second application program; the input unit is further configured to receive an operation performed by the user on the icon of the second application program; the display unit is further configured to display an interface of the second application program on the display in response to the operation performed by the user on the icon of the second application program; the input unit is further configured to receive the screen capturing operation performed by the user; the processing unit is further configured to: draw a screenshot of the interface of the second application program in response to the screen capturing operation, and automatically add an image corresponding to the second application program to a position that is in the screenshot of the interface of the second application program and that corresponds to the through hole; and the display unit is configured to display the screenshot that includes the image corresponding to the second application program.

According to a fifth aspect of the embodiments of this application, an electronic device is provided, where the electronic device may include a display and a camera, a through hole is provided in the display, and the camera is embedded in the through hole. The electronic device may include a display unit and an input unit; the display unit is configured to display a first interface on the display, where the first interface includes a first interface element, and a display position of the first interface element encircles the through hole; the input unit is configured to receive a first operation performed by a user; the display unit is further configured to display a second interface on the display in response to the first operation, where the second interface includes the first interface element, and the second interface is an interface of a first application program; the input unit is further configured to receive a second operation of enabling, by the user, a first mode of the first application program; and the display unit is further configured to: display a second interface element on the second interface and skip displaying the first interface element in response to the second operation, where the second interface element includes first prompt information used to prompt that the first mode is enabled, a display position of the second interface element encircles the through bole, and a display area of the second interface element is greater than a display area of the first interface element.

With reference to the fifth aspect, in a possible implementation, the first application program may be Camera; and the first mode is a photographing mode, a video recording mode, or a scene mode of Camera.

With reference to the fifth aspect or the foregoing possible implementations, in another possible implementation, the display unit is specifically configured to change the first interface element displayed in the second interface to the second interface element based on a scene transition effect.

With reference to the fifth aspect or the foregoing possible implementations, in another possible implementation, the input unit is further configured to receive a third operation of making, by the user, a phone call; the display unit is further configured to display a call interface on the display in response to the third operation, where the call interface includes the first interface element; the input unit is further configured to receive a fourth operation performed by the user; and the display unit is further configured to display a third interlace on the display in response to the fourth operation, where the third interface is different from the call interface, the third interface includes a third interface element, the third interface element includes second prompt information used to prompt that the electronic device is currently in a call or prompt call duration, a display position of the third interface element encircles the through hole, and a display area of the third interface element is greater than the display area of the first interface element.

With reference to the fifth aspect or the foregoing possible implementations, in another possible implementation, the third interface may be a home screen or an interface of an application program; and the third interface element may be included in a status bar of the third interface.

With reference to the fifth aspect or the foregoing possible implementations, in another possible implementation, the first interface element and the second interlace element may be included in a status bar.

With reference to the fifth aspect or the foregoing possible implementations, in another possible implementation, the electronic device may further include a processing unit; the input unit is further configured to receive a screen capturing operation performed by the user; the processing unit is configured to: draw a screenshot of the first interface in response to the screen capturing operation, and automatically add a watermark to a position that is in the screenshot of the first interface and that corresponds to the through hole; and the display unit is further configured to display the screenshot that includes the watermark.

With reference to the fifth aspect or the foregoing possible implementations, in another possible implementation, the electronic device may further include a processing unit; the input unit is further configured to receive the screen capturing operation performed by the user; the processing unit is configured to: draw a screenshot of the second interface in response to the screen capturing operation, and automatically add an image corresponding to the first application program to a position that is in the screenshot of the second interface and that corresponds to the through hole; and the display unit is configured to display the screenshot that includes the image corresponding to the first application program.

According to a sixth aspect of the embodiments of this application, an electronic device is provided, where the electronic device may include a display and a camera, a through hole is provided in the display, and the camera is embedded in the through hole. The electronic device may include a display unit and an input unit; the display unit is configured to display a first interface on the display, where the first interface includes a first interface element, and a display position of the first interface element encircles the through hole; the input unit is configured to receive a first operation of making, by a user, a phone call; the display unit is further configured to display a call interface on the display in response to the first operation, where the call interface includes the first interface element; the input unit is further configured to receive a second operation performed by the user; and the display unit is further configured to display a second interface on the display in response to the second operation, where the second interface is different from the call interface, the second interface includes a second interface element, the second interface element includes prompt information used to prompt that the electronic device is currently in a call or prompt call duration, a display position of the second interface element encircles the through hole, and a display area of the second interface element is greater than a display area of the first interface element.

With reference to the sixth aspect, in a possible implementation, the second interface may be a home screen or an interface of an application program; and the first interface element and the second interface element may be included in a status bar.

With reference to the sixth aspect or the foregoing possible implementation, in another possible implementation, the electronic device may further include a processing unit; the input unit is further configured to receive a screen capturing operation performed by the user; the processing unit is configured to: draw a screenshot of the second interface in response to the screen capturing operation, and automatically add an image corresponding to Phone to a position that is in the screenshot of the second interface and that corresponds to the through hole; and the display unit is further configured to display the screenshot that includes the image corresponding to Phone.

According to a seventh aspect of the embodiments of this application, an electronic device is provided, where the electronic device may include one or more processors, a memory, a display; a camera, and one or more computer programs; a through hole is provided in the display; the camera is embedded in the through hole; the one or more processors, the memory, the display, and the camera are connected by using one or more communications buses; the one or more computer programs are stored in the memory and are configured to be executed by the one or more processors; and the one or more computer programs include instructions, and the instructions may be configured to perform the screenshot generating method in the first aspect or the possible implementations of the first aspect, or the instructions may be configured to perform the control method according to any one of the second aspect or the possible implementations of the second aspect, or the instructions may be configured to perform the control method according to any one of the third aspect or the possible implementations of the third aspect.

According to an eighth aspect of the embodiments of this application, a computer storage medium is provided, where the computer storage medium may include a computer instruction, and when the instruction is run on an electronic device, the electronic device is enabled to perform the screenshot generating method in the first aspect or the possible implementations of the first aspect, or the electronic device is enabled to perform the control method according to any one of the second aspect or the possible implementations of the second aspect, or the electronic device is enabled to perform the control method according to any one of the third aspect or the possible implementations of the third aspect.

According to a ninth aspect of the embodiments of this application, a computer program product is provided, where when the computer program product is run on a computer, the computer is enabled to perform the screenshot generating method in the first aspect or the possible implementations of the first aspect, or the computer is enabled to perform the control method according to any one of the second aspect or the possible implementations of the second aspect, or the computer is enabled to perform the control method according to any one of the third aspect or the possible implementations of the third aspect.

According to a tenth aspect of the embodiments of this application, an apparatus is provided. The apparatus has a function of implementing a behavior of an electronic device in the method in the first aspect, or the second aspect, or the third aspect. The function may be implemented by using hardware, or may be implemented by using hardware executing corresponding software. The hardware or the software includes one or more modules corresponding to the foregoing function.

It should be understood that, in this application, descriptions about technical features, technical solutions, beneficial effects, or similar words do not imply that all characteristics and advantages can be implemented in any single embodiment. On the contrary, it can be understood that the descriptions about features or beneficial effects mean that at least one embodiment includes particular technical features, technical solutions, or beneficial effects. Therefore, in the specification, the descriptions about technical features, technical solutions, or beneficial effects are not necessarily included in a same embodiment. In addition, technical features, technical solutions, and beneficial effects described in the embodiments may be further combined in any appropriate manner. Persons skilled in the art understand that, an embodiment can be implemented without one or more particular technical features, technical solutions, or beneficial effects in a particular embodiment. In another embodiment, an additional technical feature and beneficial effect can be identified in a particular embodiment that does not reflect all embodiments.

BRIEF DESCRIPTION OF DRAWINGS

FIG. 7(a) and FIG. 7(b) are schematic diagrams of still some other graphical user interfaces displayed on an electronic device according to an embodiment of this application;

FIG. 8 is a schematic flowchart of another control method according to an embodiment of this application;

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, the word such as "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "example" or the like is intended to present a relative concept in a specific manner.

Figure 1:
FIG. 1 is a schematic diagram of some graphical user interfaces displayed on an electronic device according to an embodiment of this application.

Currently, a camera has become a tool of standard configuration in a mobile phone. For ease of taking a settle by a user, a camera is usually disposed on a front end of the mobile phone, and the camera may be referred to as a front-facing camera. Usually, the front-facing camera is disposed within an upper bezel of a display of the mobile phone. To increase a size of the display of the mobile phone without changing a size of the mobile phone, as shown in FIG. 1, a hole may be dug on a display 101 (for example, on an upper left corner) of a mobile phone, to form a through hole, so that a camera 102 can be embedded in the through hole.

However, after being embedded in the through hole of the display, the camera looks abrupt in an interface displayed on the display. In addition, the interface displayed on the display of the mobile phone usually includes many interface elements to satisfy the use's various interaction requirements. However, interface elements included in a current interface cannot prompt a current status of the mobile phone to the user effectively.

An embodiment of this application provides a control method. The method may be applied to an electronic device that includes a camera and a display, where the display is provided with a through hole, and the camera is embedded in the through hole. In the method provided in this embodiment of this application, an interface element included in an interface displayed on the display is associated with the camera, thereby alleviating the abruptness of the camera in the interface displayed on the display. Moreover, in a manner in which the interface element associated with the camera is changed based on the current status of the electronic device, thereby prompting, beside the camera, the current status of the electronic device, the interface element can better prompt the current status of the electronic device to the user, so that prompting efficiency is improved, the user learns of the current status of the electronic device more intuitively and quickly, and the intelligence of human-computer interaction is increased.

In addition, the user usually saves interesting content in a form of a screenshot, and a volume of information included therein is limited. An embodiment of this application further provides a screenshot generating method. After receiving a screen capturing operation performed by the user, the electronic device automatically adds an image corresponding to a related application program to a position that is in the drawn screenshot and that corresponds to the through hole provided in the display. In this way, the user who views the screenshot can obtain, without a related context, more current system information when the screen is captured, for example, an application program run when the screen is captured. A volume of information included in the screenshot is increased, so that interaction efficiency is improved, and intelligence of human-computer interaction is increased.

It should be noted that, the electronic device in the embodiments of this application may be a mobile phone, a tablet computer, a desktop, laptop, or handheld computer, a notebook computer, an ultra-mobile personal computer (Ultra-mobile Personal Computer, UMPC), a netbook, a cellular phone, a personal digital assistant (Personal Digital Assistant, PDA), a wearable device, or another device. A specific form of the device is not particularly limited in the embodiments of this application.

Figure 2:
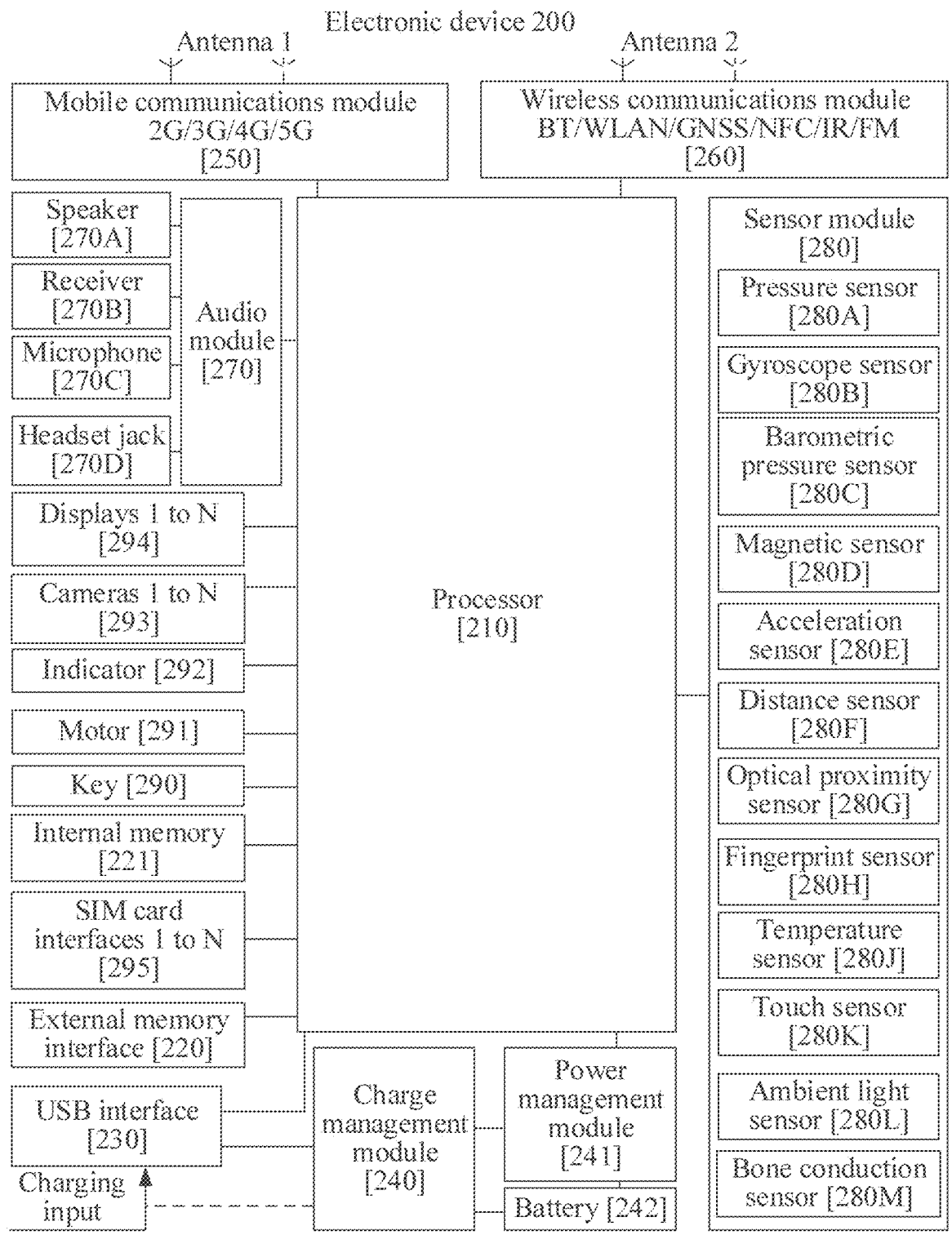
FIG. 2 is a schematic structural diagram of an electronic device 200 according to an embodiment of this application.

FIG. 2 is a schematic structural diagram of an electronic device 200.

The electronic device 200 may include a processor 210, an external memory interface 220, an internal memory interface 221, a universal serial bus (universal serial bus. USB) interface 230, a charge management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a key 290, a motor 291, an indicator 292, a camera 293, a display 294, a subscriber identity module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that, the schematic structure provided in the embodiments of this application does not constitute specific limitation to the electronic device 200. In some other embodiments, the electronic device 200 may include more or fewer components than those shown in the figure, or some components may be combined, or some components may be split, or a different component deployment may be used. The components shown in the figure may be implemented by hardware, software, or a combination of hardware and software.

The processor 210 may include one or more processing units. For example, the processor 210 may include an application processor (application processor. AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated in one or more processors.

The controller may be a nerve center and a command center of the electronic device 200. The controller can generate an operation control signal based on an instruction operation code and a time sequence signal, to complete control of instruction obtaining and instruction execution.

A memory may be further disposed in the processor 210 to store an instruction and data. In some embodiments, the memory in the processor 210 is a cache. The memory can store an instruction or data that the processor 210 has just used or recycled. If the processor 210 needs to use the instruction or the data again, the processor 210 can directly call the instruction or the data from the memory. In this way, repeated access is avoided, and waiting time of the processor 210 is reduced, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interlace, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interlace, a subscriber identity module (subscriber identity module, SIM) interface, and/or a universal serial bus (universal serial bus, USB) interface, and the like.

The I2C interface is a two-way synchronization serial bus, including a serial data line (serial data line. SDA) and a serial clock line (derail clock line, SCL). In some embodiments, the processor 210 may include a plurality of I2C buses. The processor 210 may be coupled to the touch sensor 280K, a charger, a flash, the camera 293, and the like, respectively through different I2C bus interfaces. For example, the processor 210 may be coupled to the touch sensor 280k through the I2C interface, to enable the processor 210 to communicate with the touch sensor 280K through the I2C bus interface, thereby implementing a touch function of the electronic device 200.

The I2S interface may be used for audio communication. In some embodiments, the processor 210 may include a plurality of I2S buses. The processor 210 may be coupled to the audio module 270 through the I2S bus, thereby implementing communication between the processor 210 and the audio module 270. In some embodiments, the audio module 270 may transfer an audio signal to the wireless communications module 260 through the I2S interface, thereby implementing a function of answering a call by using a Bluetooth headset.

The PCM interface may also be used for audio communication, and sampling, quantizing, and encoding analog signals. In some embodiments, the audio module 270 and the wireless communications module 260 may be coupled to each other through the PCM bus interface. In some embodiments, the audio module 270 may also transfer an audio signal to the wireless communications module 260 through the PCM interface, thereby implementing the function of answering a call by using a Bluetooth headset. The I2S interface and the PCM interface can be both used for audio communication.

The UART interface is a universal serial data bus and is used for asynchronous communication. The bus may be a two-way communications bus. The bus converts to-be-transmitted data between serial communication and parallel communication. In some embodiments, the UART interface is usually configured to connect the processor 210 and the wireless communications module 260. For example, the processor 210 is in communication with a Bluetooth module in the wireless communications module 260 through the UART interface, thereby implementing a Bluetooth function. In some embodiments, the audio module 270 may transfer an audio signal to the wireless communications module 260 through the UART interface, thereby implementing a function of playing music by using a Bluetooth headset.

The MIPI interface may be configured to connect the processor 210 and the display 294, the camera 293, or another peripheral device. The MIPI interface includes a camera serial interface (camera serial interface, CSI), a display serial interface (display serial interface, DSI), and the like. In some embodiments, the processor 210 and the camera 293 are in communication with each other through the CSI interface, thereby implementing a photographing function of the electronic device 200. The processor 210 and the display 294 are in communication with each other through the DSI interface, thereby implementing a display function of the electronic device 200.

The GPIO interface may be configured by using software. The GPIO interface may be configured to be a control signal, or may be configured to be a data signal. In some embodiments, the GPIO interface may be configured to connect the processor 210 and the camera 293, the display 294, the wireless communications module 260, the audio module 270, the sensor module 280, and the like. The GPIO interface may alternatively be configured to be an I2C interface, an I2S interface, a UART interface, an MIPI interface, or the like.

The USB interlace 230 is an interface satisfying a USB standard specification, and may specifically be a Mini USB interface, a Micro USB interface, a USB Type C interface, or the like. The USB interface 230 can be used to connect a charger to charge the electronic device 200, or may be used to transmit data between the electronic device 200 and a peripheral device, or may be used to connect a headset to play an audio by using the headset. The interface may also be used to connect another electronic device, such as an AR device.

It may be understood that, the schematic connection relationship between the interfaces of the modules provided in the embodiments of this application is merely schematic description, and does not constitute limitation to the structure of the electronic device 200. In some other embodiments, the electronic device 200 may alternatively use an interface connection manner different from that in the foregoing embodiment or a combination of a plurality of interface connection manners.

The charge management module 240 is configured to receive charging input from the charger. The charger may be a wireless charger or may be a wired charger. In some embodiments of the wired charger, the charge management module 240 may receive the charging input of the wired charger by using the USB interface 230. In some embodiments of the wireless charger, the charge management module 240 may receive wireless charging input by using a wireless charging coil of the electronic device 200. At the same time of charging the battery 242, tire charge management module 240 may further supply power to the electronic device by using the power management module 241.

The power management module 241 is configured to connect the battery 242, the charge management module 240, and the processor 210. The power management module 241 receives input from the battery 242 and/or input from the charge management module 240, and supplies power to the memory 210, the internal memory 221, an external memory, the display 294, the camera 293, the wireless communications module 260, and the like. The power management module 241 may be further configured to monitor a battery capacity, a quantity of circular times of the battery, a battery health condition (power leakage, resistance), or another parameter. In some other embodiments, the power management module 241 may alternatively be disposed in the processor 210. In some other embodiments, the power management module 241 and the charge management module 240 may alternatively be disposed in a same component.

A wireless communication function of the electronic device 200 can be implemented by using the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device 200 can be configured to cover single one or more communications frequency bands. Different antennas may be reused to increase utilization of the antenna. For example, the antenna 1 may be reused as a diversity antenna of a wireless local area network. In some other embodiments, the antenna may be used in combination with a tuning switch.

The mobile communications module 250 can provide solutions of wireless communication including 2G/3G/4G/5G applied to the electronic device 200. The mobile communications module 250 may include at feast one filter, a switch, a power amplifier, a low noise amplifier (low noise amplifier, LNA), and the like. The mobile communications module 250 can receive an electromagnetic wave by using the antenna 1, perform filtering, amplification, and other processing on the received electromagnetic wave, and transport the electromagnetic wave to the modem processor for demodulation. The mobile communications module 250 can also amplify a signal obtained after being modulated by the modem processor, and transform the signal into an electromagnetic wave and radiate the electromagnetic wave by using the antenna 1. In some embodiments, at least some functional modules of the mobile communications module 250 may be disposed in the processor 210. In some embodiments, at least some functional modules of the mobile communications module 250 and at least some modules of the processor 210 may be disposed in a same component.

The modem processor may include a modulator and a demodulator. The modulator is configured modulate a to-be-sent low-frequency baseband signal into a medium- or high-frequency signal. The demodulator is configured to demodulate a received electromagnetic wave signal into a low-frequency baseband signal. Then, the demodulator transports the low-frequency baseband signal obtained by demodulation to the baseband processor for processing. After being processed by the baseband processor, the low-frequency baseband signal is transferred to the application processor. The application processor outputs a sound signal by using an audio device (not limited to the speaker 270A, the receiver 270B, or the like), or displays an image or a video by using the display 294. In some embodiments, the modem processor may be an independent component. In some other embodiments, the modem processor may be independent to the processor 210, and is disposed in a same component with the mobile communications module 250 or another functional module.

The wireless communications module 260 can provide solutions of wireless communication including wireless local area networks (wireless local area networks, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like applied to the electronic device 200. The wireless communications module 260 may be one or more components in which at feast one communications processing module is integrated. The wireless communications module 260 receives an electromagnetic wave by using the antenna 2, performs frequency modulation and filtering processing on an electromagnetic signal, and sends the processed signal to the processor 210. The wireless communications module 260 can also receive a to-be-sent signal from the processor 210, perform frequency modulation and amplification on the signal, and transform the signal into an electromagnetic wave and radiate the electromagnetic wave by using the antenna 2.

In some embodiments, the antenna 1 and the mobile communications module 250 of the electronic device 200 are coupled, the antenna 2 and the wireless communications module 260 are coupled, so that the electronic device 200 can perform communication with another device by using a wireless communications technology and a network.

The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTD, email, BT, GNSS, WLAN, NFC, FM, and/or an IR technology, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 200 implements a display function by using the GPU, the display 294, the application processor, and the like. The GPU is a microprocessor for image processing, and is connected to the display 294 and the application processor. The GPU is configured to perform mathematical and geometric calculation for graphic rendering. The processor 210 may include one or more GPUs, and the GPU executes a program instruction to generate or change display information.

The display 294 is configured to display an image, a video, or the like. The display 294 includes a display panel. The display panel can use liquid crystal display (liquid crystal display, LCD), organic light-emitting diode (organic light-emitting diode, OLED), active-matrix organic light emitting diode (active-matrix organic light emitting diode, AMOLED), flex light-emitting diode (flex light-emitting diode, FLED), Miniled, MicroLed, Micro-oLed, quantum dot light emitting diodes (quantum dot light emitting diodes, QLED) or the like. In some embodiments, the electronic device 200 may include one or N displays 294, where N is a positive integer greater than one. In the embodiments of this application, a hole may be dug on the display 294. For example, a through hole is arranged on an upper left corner, an upper right corner, or another position of the display 294, and the camera 293 can be embedded in the through hole.

The electronic device 200 can implement a photographing function by using the ISP, the camera 293, the video codec, the GPU, the display 294, the application processor, and the like.

The ISP is configured to process data fed back by the camera 293. For example, during photographing, the shutter is opened, a light ray is transferred to a light sensing component of the camera, a light signal is transformed into an electrical signal, and the light sensing component of camera transfers the electrical signal to the ISP to transform the electrical signal into an image visible to human eyes. The ISP can also perform algorithm optimization on noise, brightness, and a skin color in the image. The ISP can also optimize exposure, a color temperature, or another parameter of a photographing scene. In some embodiments, the ISP may be disposed in the camera 293.

The camera 293 is configured to capture a static image or a video. An optical image of an object is generated by a lens and is projected to the light sensing component. The light sensing component may be a charge coupled device (charge coupled device, CCD) sensor or a complementary metal-oxide-semiconductor (complementary metal oxide semiconductor, CMOS) phototransistor. The light sensing component transforms the light signal into the electrical signal, and then transfers the electrical signal to the ISP to transform the electrical signal into a digital image signal. The ISP outputs the digital image signal to the DSP for processing. The DSP transforms the digital image signal into an image signal of standard RGB, YU V. or another format. In some embodiments, the electronic device 200 may include one or N cameras 293, where N is a positive integer greater than one.

The digital signal processor is configured to process a digital signal, and can process another digital signal apart from processing the digital image signal, for example, when the electronic device 200 selects a frequency, the digital signal processor is configured to perform Fourier transform on frequency energy.

The video codec is configured to compress or decompress a digital video. The electronic device 200 can support one or more types of video codecs. In this way, the electronic device 200 can play or record videos of various coding formats, such as moving picture experts group, (moving picture experts group, MPEG) 1, MPEG2, MPEG3, MPEG4, and the like.

The NPU is a neural-network (neural-network, NN) calculation processor, quickly processes input information by learning from a structure of a biological neural network, for example, learning from a transmitting mode in between neurons in a human brain, and can continuously perform self learning. By using the NPU, the electronic device 200 can implement an application including intelligent cognition, such as image recognition, human face recognition, voice recognition, text understanding, or the like.

The external memory interface 220 can be configured to connect an external memory card, such as a Micro SD card, to implement extension of a storage capability of the electronic device 200. The external memory card implements a data storage function by using the external memory interface 220 and the processor 210. For example, a video or another file is stored in the external memory card.

The memory 221 can be configured to store computer-executable program code, and the executable program code includes an instruction. The processor 210 runs the instruction stored in the internal memory 221, to perform various function applications and data processing of the electronic device 200.

The internal memory 221 may include a program storage area and a data storage area. The program storage area may store an operating system, an application program required by at least one function (such as a sound playback function and an image display function), and the like. The data storage area may store data (such as audio data and an address book) created according to use of the electronic device 200, and the like. In addition, the internal memory 221 may include a high speed random access memory, and may also include a non-volatile memory, such as at least one magnetic disk memory, a flash memory, a universal flash storage (universal flash storage, UFS), or the like.

The electronic device 200, by using the audio module 270, the speaker 270A, the receiver 270B, the microphone 270C, the headset jack 270D, the application processor, and the like, can implement an audio function, for example, music playback or recording.

The audio module 270 is configured to transform digital audio information into analog audio signal output, and is also configured to transform analog audio input into a digital audio signal. The audio module 270 can also be configured to encode and decode an audio signal. In some embodiments, the audio module 270 can be disposed in the processor 210, or some functional modules of the audio module 270 is disposed in the processor 210.

The speaker 270A, also referred to as a "loudspeaker", is configured to transform an audio electrical signal into a sound signal. The electronic device 200 can play music or play hands-tree phone call by using the speaker 270A.

The receiver 270B, also referred to as an "earpiece", is configured to transform an audio electrical signal into a sound signal. When the electronic device 200 answers a call or plays voice information, the receiver 270B can be put close to a human ear to listen to the sound.

The microphone 270C, also referred to as a "mouthpiece" or a "voice transmitter", is configured to transform a sound signal into an electrical signal. When making a phone call or sending voice information, the user can put the microphone 270C near the mouth, and input a sound signal into the microphone 270C. At least one microphone 270C can be disposed on the electronic device 200. In some other embodiments, two microphones 270C can be disposed on the electronic device 200, and in addition to collecting the sound signal, can implement a function of noise reduction. In some other embodiments, there may be three, four, or more microphones 270C disposed on the electronic device 200, to implement sound signal collecting and noise reduction, and in addition, a sound source can be identified to implement a directional recording function.

The headset jack 270D is configured to connect a wired headset. The headset jack 2701) may be the USB interface 230, or may be a 3.5 mm interface of an open mobile terminal platform (open mobile terminal platform, OMTP) standard, or an interface of a cellular telecommunications industry association of the USA (cellular telecommunications industry association of the USA, CTIA) standard.

The pressure sensor 280A is configured to sense a pressure signal, and can transform the pressure signal into an electrical signal. In some embodiments, the pressure sensor 280A can be disposed in the display 294.

There are various pressure sensors 280A, such as a resistive pressure sensor, an inductive pressure sensor, a capacitive pressure sensor, or the like. The capacitive pressure sensor may include at least two parallel panels that have conductive materials. When a force is applied to the pressure sensor 280A, capacitance between electrodes changes. The electronic device 200 determines a strength of the pressure based on the change of the capacitance. When there is a touch operation on the display 294, the electronic device 200 detects a strength of the touch operation according to the pressure sensor 280A.

The electronic device 200 can also calculate a touching position based on a detection signal of the pressure sensor 280A. In some embodiments, touch operations applied to a same touch position but with different touch operation strengths may correspond to different operation instructions. For example, when a touch operation of which a touch operation strength is less than a first pressure threshold is applied to an icon of an SMS message application, an instruction of viewing an SMS message is executed. When a touch operation of which a touch operation strength is greater than or equal to the first pressure threshold is applied to the icon of the SMS message application, an instruction of creating an SMS message is executed.

The gyroscope sensor 280B can be configured to determine a motion posture of the electronic device 200. In some embodiments, angular velocities of the electronic device 200 around three axes (namely, x, v, and z axes) can be determined by using the gyroscope sensor 280B. The gyroscope sensor 280B can be used for photographing stabilization. For example, when the shutter is pressed, the gyroscope sensor 280B detects a trembling angle of the electronic device 200, and obtains a distance that a camera module needs to compensate for by calculation based on the angle, so that the lens in enabled to move in an opposite direction to counteract the trembling of the electronic device 200, thereby implementing stabilization. The gyroscope sensor 280B may also be used in a scenario of navigation or a motion sensing game.

The barometric pressure sensor 280C is configured to measure a barometric pressure. In some embodiments, the electronic device 200 calculates an altitude height based on a barometric pressure value measured by the barometric pressure sensor 280C, to assist positioning and navigation.

The magnetic sensor 280D includes a Hall effect sensor. The electronic device 200 can detect, by using the magnetic sensor 280D, whether a flipping cover or a case is open or closed. In some embodiments, when the electronic device 200 is a flipping device, the electronic device 200 can detect, by using the magnetic sensor 280D, whether the flipping cover is open or closed, and further set, based on the detected open-closing slate of the case or open-closing state of the flipping cover, a feature including automatically unlocking by flipping and the like.

The acceleration sensor 280B can detect acceleration values of the electronic device 200 in each direction (generally three axes), and can detect a value and a direction of the gravity when the electronic device 200 is static. The acceleration sensor 280E may further be configured to identify a posture of the electronic device, and is applied to switching between a portrait or landscape screen, a step counter, or another application.

The distance sensor 280F is configured to measure a distance, the electronic device 200 can measure the distance by using infrared or laser. In some embodiments, at the photographing scene, the electronic device 200 can measure a distance by using the distance sensor 280F to implement fast focusing.

The optical proximity sensor 280G may include, for example, a light emitting diode (LED) and a light detector, such as a photodiode. The light emitting diode may be an infrared light emitting diode.

The electronic device 200 emits infrared light by using the light emitting diode. The electronic device 200 detects infrared reflection light by using the photodiode. When detecting sufficient reflection light, it can be determined that there is an object near the electronic device 200. When detecting insufficient reflection light, the electronic device 200 can determine that there is no object near the electronic device 200. The electronic device 200 can detect, by using the optical proximity sensor 280G that the user holds the electronic device 200 near to an ear for conversation, so that the screen can be automatically turned off to save power. The optical proximity sensor 280G can also be used for automatic screen unlocking and lock in a case mode or a pocket mode.

The ambient light sensor 280L is used to sense environment brightness. The electronic device 200 can self-adaptively adjust brightness of the display 294 based on the sensed environment brightness. The ambient light sensor 280L can also be configured to automatically adjust white balance during photographing. The ambient light sensor 280L can further be used in cooperation with the optical proximity sensor 280G to detect whether the electronic device 200 is in a pocket, thereby prevent accidental touch.

The fingerprint sensor 280H is used to collect a fingerprint. The electronic device 200 can implement fingerprint unlocking, application lock accessing, fingerprint photographing, fingerprint call answering, and the like by using a collected fingerprint feature.

The temperature sensor 280J is configured to detect inclination a temperature. In some embodiments, the electronic device 200 performs a temperature processing policy based on the temperature detected by the temperature sensor 280J.

For example, when the temperature reported by the temperature sensor 280J exceeds a threshold, the electronic device 200 performs a performance of cooling down a processor near the temperature sensor 280J, to reduce power consumption and implement heat protection. In some other embodiments, when the temperature is lower than another threshold, the electronic device 200 heats the battery 242, to prevent the electronic device 200 from abnormal power-off caused by the low temperature. In some other embodiments, when the temperature is lower than still another threshold, the electronic device 200 increases an output voltage of the battery 242, to avoid abnormal power-off caused by the low temperature.

The touch sensor 280K is also referred to as a "touch panel". The touch sensor 280K can be disposed in the display 294, and the touch sensor 280K and the display 294 form a touchscreen, also referred to as a "touch-control screen".

The touch sensor 280K is configured to detect a touch operation applied on or near the touch sensor 280K. The touch sensor can transfer a detected touch operation to the application processor to determine a touch event type. Visual output related to the touch operation can be provided by the display 294. In some other embodiments, the touch sensor 280K may alternatively be disposed on a surface of the electronic device 200 and at a different positioning with the display 294.

The bone conduction sensor 280M can obtain a vibration signal. In some embodiments, the bone conduction sensor 280M can obtain a vibration signal from a vibrating bone of an acoustic part in a human body. The bone conduction sensor 280M can also contact human pulses to receive a blood pressure vibration signal.

In some embodiments, the bone conduction sensor 280M may alternatively be disposed in a headset to form a bone conduction headset. The audio module 270 can obtain an audio signal by parsing the vibration signal from the vibrating bone of the acoustic part obtained by the bone conduction sensor 280M, thereby implementing an audio function. The application processor may parse heart rate information based on the blood pressure vibration signal obtained by the bone conduction sensor 280M, thereby implementing a heart rate detection function.

The key 290 includes a power key, a volume key, or the like. The key 290 may be a mechanical key, or may be a touch key. The electronic device 200 may receive key pressing input, and generate key signal input related to user setting and function control of the electronic device 200.

The motor 291 can generate a vibration prompt. The motor 291 can be used for an incoming call vibration prompt, and may also be used for touch vibration feedback. For example, touch operations applied to different applications (such as photographing and audio playing) may correspond to different vibration feedback effects. Touch operations applied to different areas of the display 294 may also correspond to different vibration feedback effects produced by the motor 291. Different application scenarios (such as: time reminding, information receiving, clock alarming, and gaming) may also correspond to different vibration feedback effects. The touch vibration feedback effect may also be customized.

The indicator 292 may be an indication light, may be configured to indicate a charging state, a battery change, and may also be configured to indicate a message, a missed incoming call, a notification, and the like.

The SIM card interface 295 is used to connect a SIM card. The SIM card can be inserted into the SIM card interface 295 or removed from the SIM card interface 295, thereby implementing contact with and removal from the electronic device 200.

The electronic device 200 may support one or N SIM card interfaces, where N is a positive integer greater than one. The SIM card interface 295 can support a Nano SIM card, a Micro SIM card, a SIM card, and the like. A plurality of cards may be inserted into a same SIM card interface 295. The plurality of cards may have a same type or different types.

The SIM card interface 295 may also be compatible to SIM cards of different types. The SIM card interface 295 may also be compatible to an external memory card. The SIM card interacts with a network, so that the electronic device 200 can implement conversation, data communication, and another function. In some embodiments, the electronic device 200 uses an eSIM, namely an embedded SIM card. The eSIM card is embedded in the electronic device 200, and cannot be separated from the electronic device 200.

A software system of the electronic device 200 may use a hierarchical architecture, an event-driven architecture, a micro core architecture, a micro service architecture, or a cloud architecture. In the embodiments of this application, an example of an Android system of the hierarchical architecture is used to describe the software structure of the electronic device 200.

Figure 3:
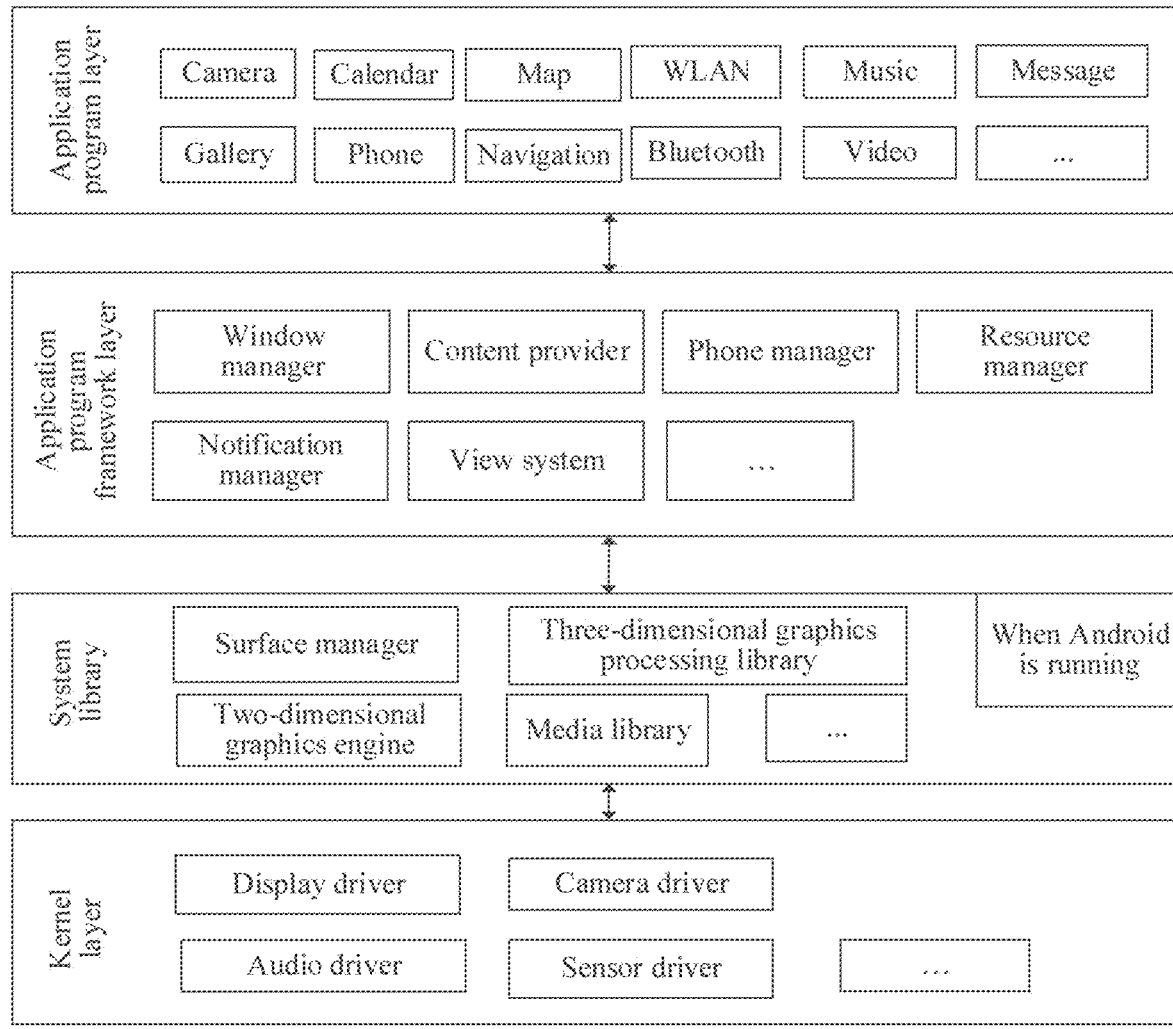
FIG. 3 is a block diagram of a software structure of an electronic device 200 according to an embodiment of this application.

FIG. 3 is a block diagram of the software structure of the electronic device 200 according to the embodiments of this application.

In the hierarchical architecture, software is divided into layers, and each layer has a clear role and task. The layers are in communication with each other by using a software interface. In some embodiments, the Android system is divided into four layers, from top to bottom: an application program layer, an application program framework layer, an Android runtime (Android runtime) and a system library, and a kernel layer.

The application program layer may include a series of application program packages.

As shown in FIG. 3, the application program package may include Camera, Gallery, Calendar, Phone, Map, Navigation, WLAN, Bluetooth, Music, Video, Message, or another application program.

The application program framework layer provides an application programming interface (application programming interface, API) and a programming framework for the application in the application program layer. The application program framework includes some predefined functions.

As shown in FIG. 3, the application program framework layer includes a window manager, a service provider, a view system, a phone manager, a resource manager, a notification manager, and the like.

The window manager is used to manage a window program. The window manager can obtain a size of the display, determine whether there is a status bar, lock the screen, capture the screen, and the like.

The service provider is used to save and obtain data, and enable the data to be accessed by the application program. The data may include a video, an image, an audio, made and incoming calls, a browsing history and a bookmark, a phone book, or the like.

The view system includes a visualized control, for example, a word displaying control, or an image displaying control. The view system can be used to construct the application program. A display interface may include one or more views. For example, a display interface including a message notification icon may include a view displaying words and a view displaying an image.

The phone manager is used to provide a communication function of the electronic device 200, for example, conversation status management (including answering, hanging up, and the like).

The resource manager provides the application program with various resources, such as a localized character string, an icon, a picture, a layout file, or a video file.

The notification manager enables the application program to display notification information in the status bar, so that a message of a notification type can be sent and can automatically disappear after a short stay, and user interaction is not needed. For example, live notification manager is used to tell that downloading is complete, or used for a message prompt.

The notification manager may also be a notification that appears in a form of a table or running text in a top status bar of the system. For example, text prompt information appears in the status bar, prompt tone is made, the electronic device vibrates, and the indicator light flickers.

The Android Runtime includes a core library and a virtual machine. The Android runtime is responsible for scheduling and management of the Android system.

The core library includes two parts: one part is performance functions that the java language needs to invoke, and another part is a core library of the Android.

The application program layer and the application program framework layer run in the virtual machine. The virtual machine executes java files of the application program layer and the application program framework layer as binary files. The virtual machine is used for life cycle management of an execution object, stack management, thread management, security and abnormality management, rubbish recycling, and another function.

The system library may include a plurality of functional modules, such as a surface manager (surface manager), a media library (Media Libraries), a three-dimensional graphics processing library (for example, OpenGL ES), or a 2D graphics engine (for example, SGL).

The surface manager is used to manage a display subsystem, and provides a plurality of application programs with 2D and 3D layer convergence.

The media library supports a plurality of commonly used audio and video formats, playback and recording, a static image file, and the like. The media library can support a plurality of audio and video coding formats, such as MPEG4, H.264, MP3, AAC, AMR, JPG, and PNG.

The three-dimensional graphics processing library is used to implement three-dimensional graphics drawing, graphics rendering, synthesis, layer processing, and the like.

The 2D graphics engine is a drawing engine of 2D drawing.

The kernel layer is a layer between hardware and the software. The kernel layer includes at least a display driver, a camera driver, an audio driver, and a sensor driver.

For example, all technical solutions in the following embodiments may be implemented on the electronic device 200 having the foregoing hardware architecture and the software architecture. The control method provided in the embodiments of this application is described in detail below with reference to the accompanying drawings and an application scenario.

Figure 4:
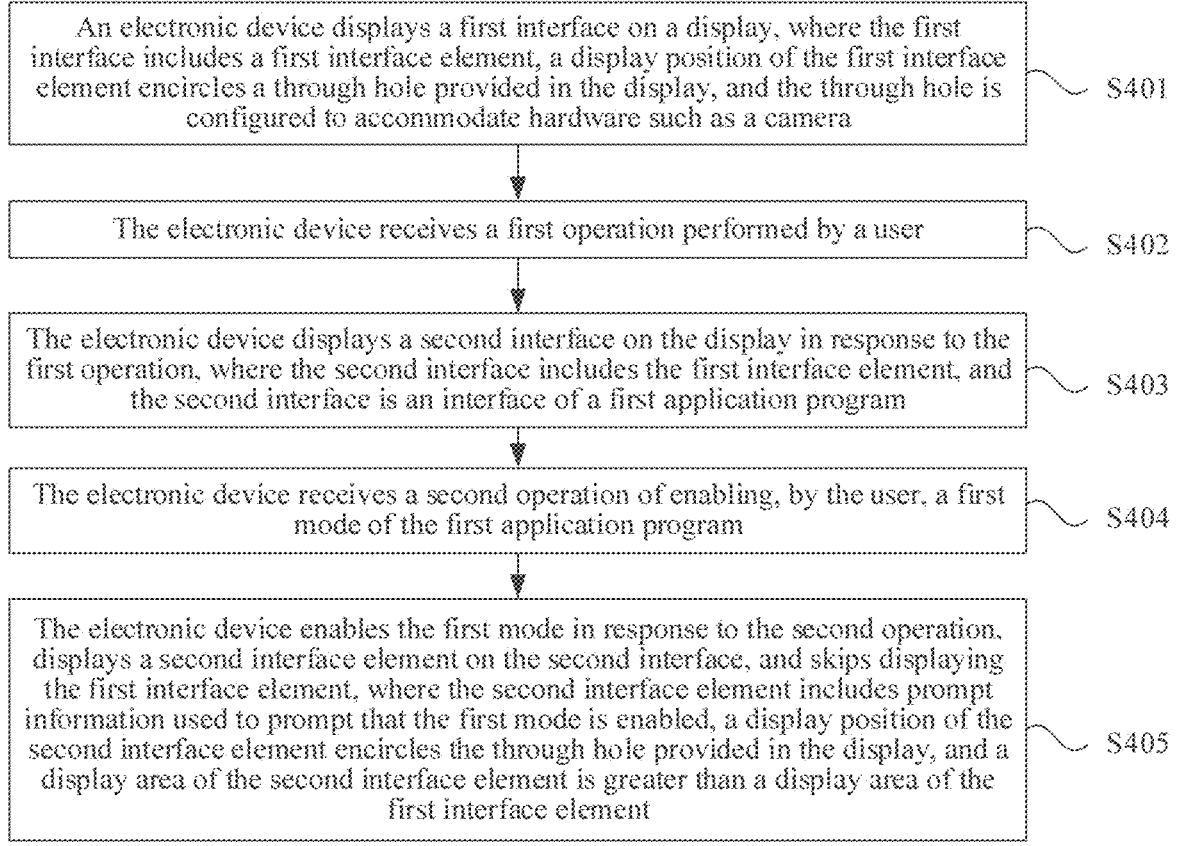
FIG. 4 is a schematic flowchart of a control method according to an embodiment of this application.

FIG. 4 is a schematic flowchart of the control method according to the embodiments of this application. The method is applied to an electronic device. The electronic device may include a display and hardware such as a camera. A through hole is provided in the display, and the hardware is embedded in the through hole provided in the display. For example, as shown in FIG. 1, the camera is embedded in the through hole provided in the display.

As shown in FIG. 4, the method may include the following S401 to S405.

S401. The electronic device displays a first interface on the display, where the first interface includes a first interface element, a display position of the first interface element encircles the through hole provided in the display, and the through hole is configured to accommodate the hardware such as the camera.

For example, when the through hole is provided in the display of the electronic device, and the camera is disposed in the through hole, when the electronic device displays the first interface on the display, the first interface element may be displayed in the display area that encircles the through hole. For example, the first interface element may be a color ring, and a display position of the color ring encircles the through hole provided in the display. In this way, the abruptness of the camera that is disposed in the through hole and that is in the interface displayed on the display can be alleviated, and a user can have better visual experience.

In some embodiments, the through hole of the display may be provided on an upper left corner, or an upper right corner of the display, or a middle position close to an upper bezel of the electronic device.

Usually, an area close to an upper bezel of the display is used to display a status bar, and correspondingly, the first interface element may be included in a status bar of the first interface displayed on the display. The status bar may further include an interface element used to prompt system time, a battery level of the electronic device, a signal condition of a network that the electronic device is connected to, or other information.

In some embodiments, the foregoing first interface may be a home screen (home screen) of the electronic device, or may be an interface of an application program in the electronic device.

Figure 5A:
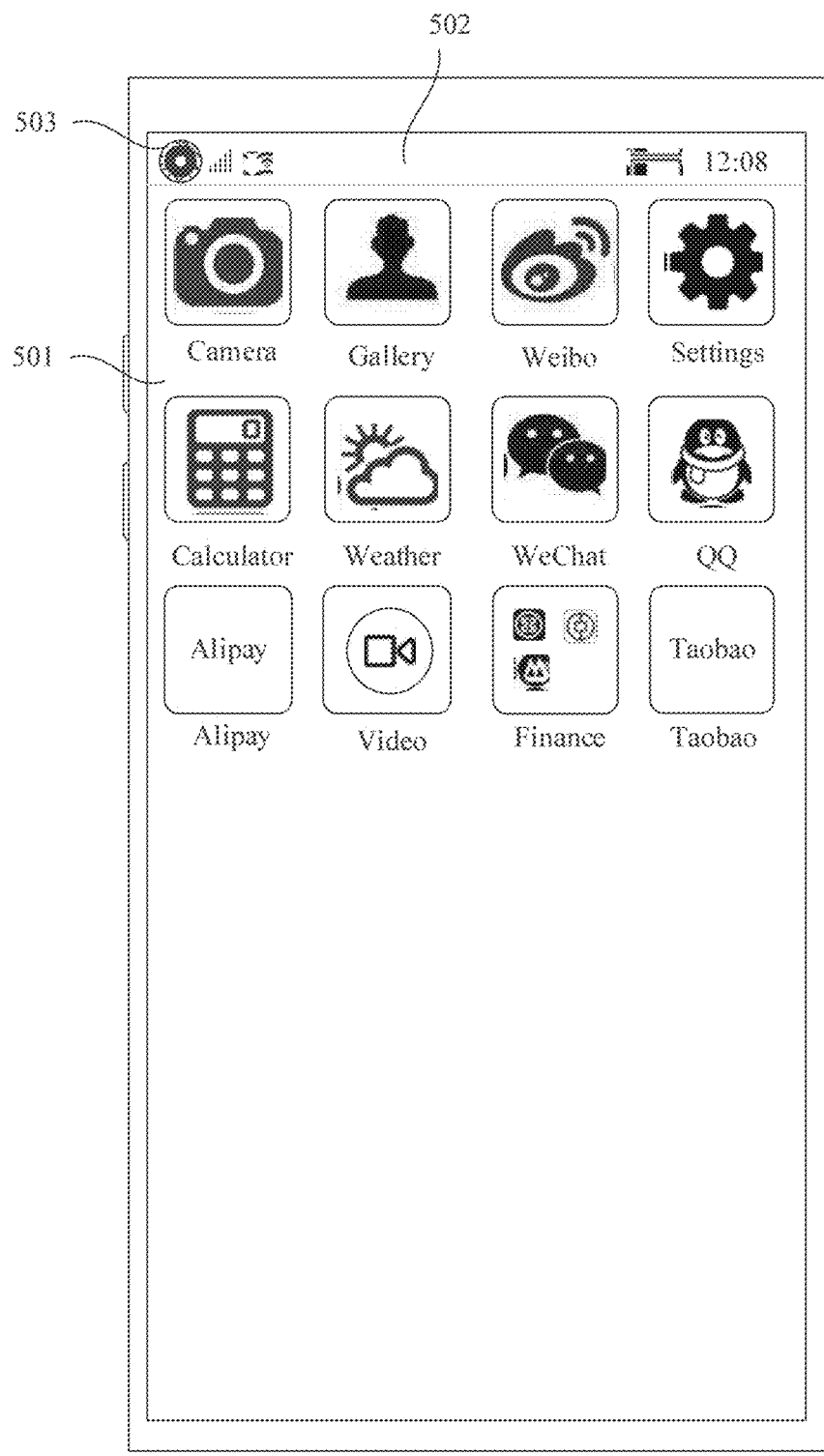
FIG. 5(a) and FIG. 5(b) are schematic diagrams of some other graphical user interfaces displayed on an electronic device according to an embodiment of this application.
Figure 5B:
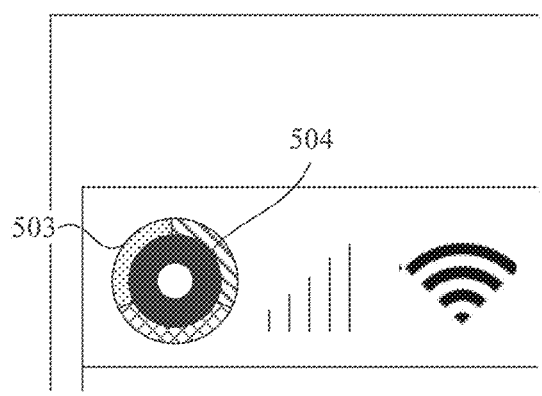

For example, with reference to FIG. 5, an example in which the first interface is the home screen of the electronic device, and the through hole of the display is provided on the upper left corner of the display is used. As shown in FIG. 5(*a*), the electronic device displays a home screen 501 on the display, where the home screen 501 includes a status bar 502, and the status bar 502 includes a first interface element 503 (such as a color ring, where FIG. 5/*a*) and FIG. 5(*b*) are filled differently to represent colors of the color ring). The FIG. 5(*b*) is a partial enlarged view of an area in which the first interface element 503 shown in FIG. 5(*a*) is located. As shown in FIG. 5(*b*), a display position of the first interface element 503 encircles the through hole provided in the display, where a camera 504 is disposed in the through hole.

Certainly, in the embodiments of this application, the first interface element displayed by the electronic device is not limited to the color ring shown in FIG. 5(*a*) and FIG. 5(*b*), and may be an interface element of another shape, another si/e, and another color. In addition, the first interface element may be displayed on the display statically, or may be displayed on the display dynamically. This is not limited in the embodiments of this application.

S402. The electronic device receives a first operation performed by the user.

S403. The electronic device displays a second interface on the display in response to the first operation, where the second interface includes the first interface element, and the second interface is an interface of a first application program.

The first operation may be used to open the first application program. For example, the first operation may be a tapping operation performed by the user on an icon of the first application program displayed on the home screen. In response to the first operation of the user, the electronic device may run the first application program and display the second interface on the display, for example, display a home screen of the first application program.

When the electronic device displays the second interface on the display, the first interface element may still be displayed in the display area that encircles the through hole provided in the display. The first application program may be any one of application programs included in the electronic device. The application program may be a system application or may be a third-party application.

Figure 6A:
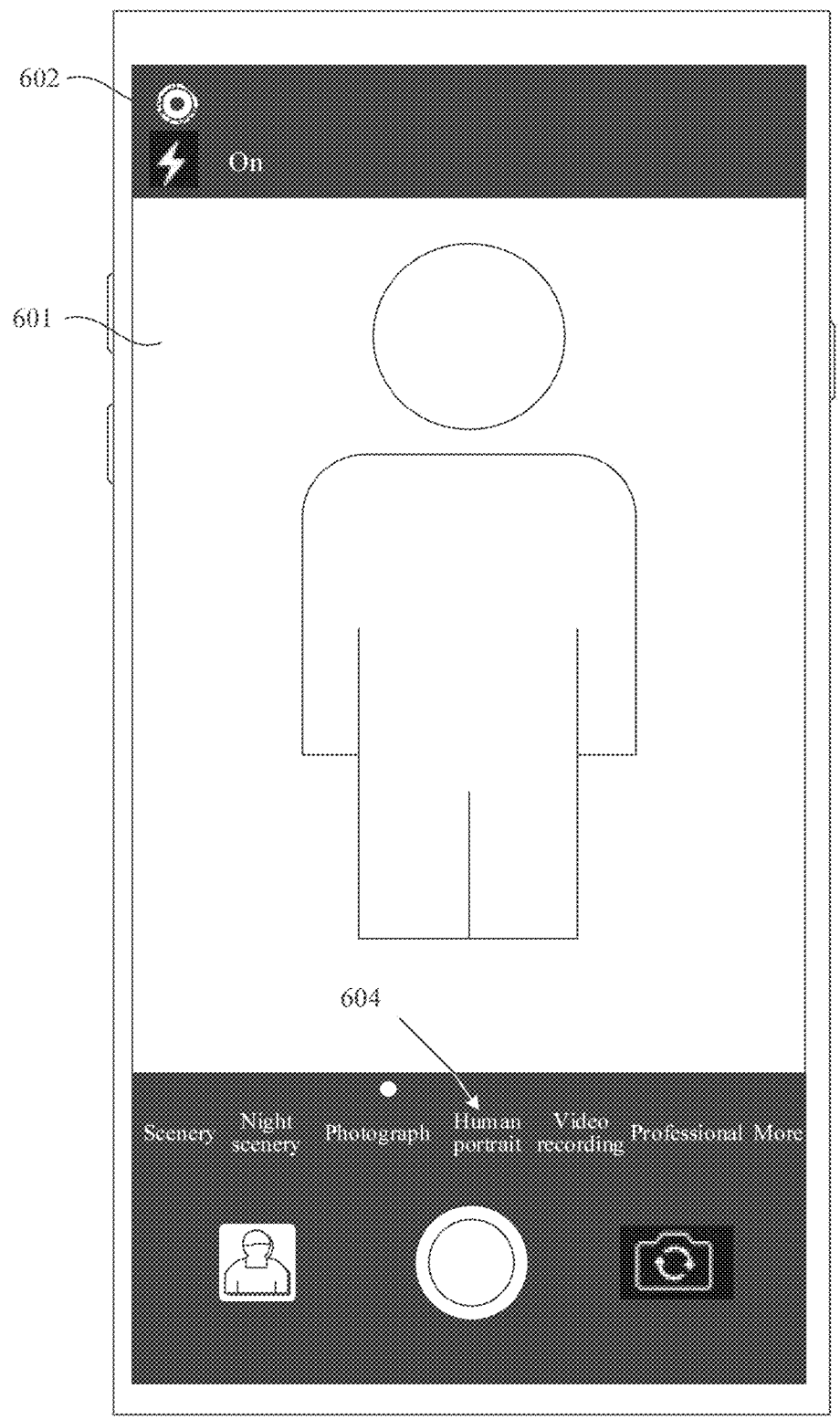
FIG. 6(a) and FIG. 6(b) are schematic diagrams of still some other graphical user interfaces displayed on an electronic device according to an embodiment of this application.
Figure 6B:
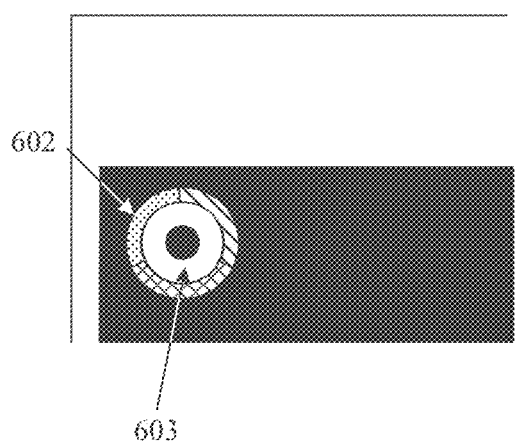

For example, with reference to FIG. 5, an example in which the first application program is Camera is used. When the user needs to use Camera to lake a photo, the user may perform the first operation, such as a tapping operation, on the icon of Camera shown in FIG. 5(*a*). As shown in FIG. 6(*a*), in response to the first operation, the electronic device may run the Camera application, and displays an interface 601 of Camera on the display. The interface 601 of Camera includes a first interface element 602 (such as a color ring, where FIG. 6(*a*) and FIG. 6(*b*) are filled differently to represent colors of the color ring). The FIG. 6(*b*) is a partial enlarged view of an area in which the first interface element 602 shown in FIG. 6(*a*) is located. As shown in FIG. 6(*b*), a display position of the first interface element 602 encircles the through hole provided in the display, where a camera 603 is disposed in the through hole.

S404. The electronic device receives a second operation of enabling, by the user, a first mode of the first application program.

An application program included in the electronic device may include a plurality of modes, and the user may set the mode of the application program to use a function corresponding to the selected mode. The first mode may be any one of modes included in the first application program.

For example, the example in which the first application program is Camera is used, and Camera may include a photographing mode, a video recording mode, and various scene modes. The scene modes may include a scenery mode, a night scenery mode, a human portrait mode, a professional mode, and the like. The user may selectively enable any one of the modes included in Camera based own preferences or a photographing requirement.

S405. The electronic device enables the first mode in response to the second operation, displays a second interface element on the second interface, and skips displaying the first interface element, where the second interface element includes prompt information used to prompt that the first mode is enabled, a display position of the second interface element encircles the through hole provided in the display, and a display area of the second interface element is greater than a display area of the first interface element.

After receiving the second operation used to enable the first mode, the electronic device may enable the first mode, and change the first interface element displayed in the display area encircling the through hole to the second interface element.

A display area of the second interface element may be greater than the display area of the first interface element, and the second interface element may include prompt information, where the prompt information is used to prompt the user that the first mode of the first application program is enabled.

For example, with reference to FIG. 6, an example in which the first application program is Camera is used. After opening Camera, if the user wants to use the human portrait mode of the scene modes of Camera, the user may perform the second operation, for example, a tapping operation, on an option 604 of the human portrait mode shown in FIG. 6(*a*). In response to the second operation, the electronic device may enable the human portrait mode of Camera, and change the first interface element 602 (for example, the color ring shown in FIG. 6(*b*)) in the interface 601 of Camera displayed on the display to the second interface element 701. For example, the second interface element 701 is an interface element in a shape of a capsule, as shown in FIG. 7(*a*).

Figure 7A:
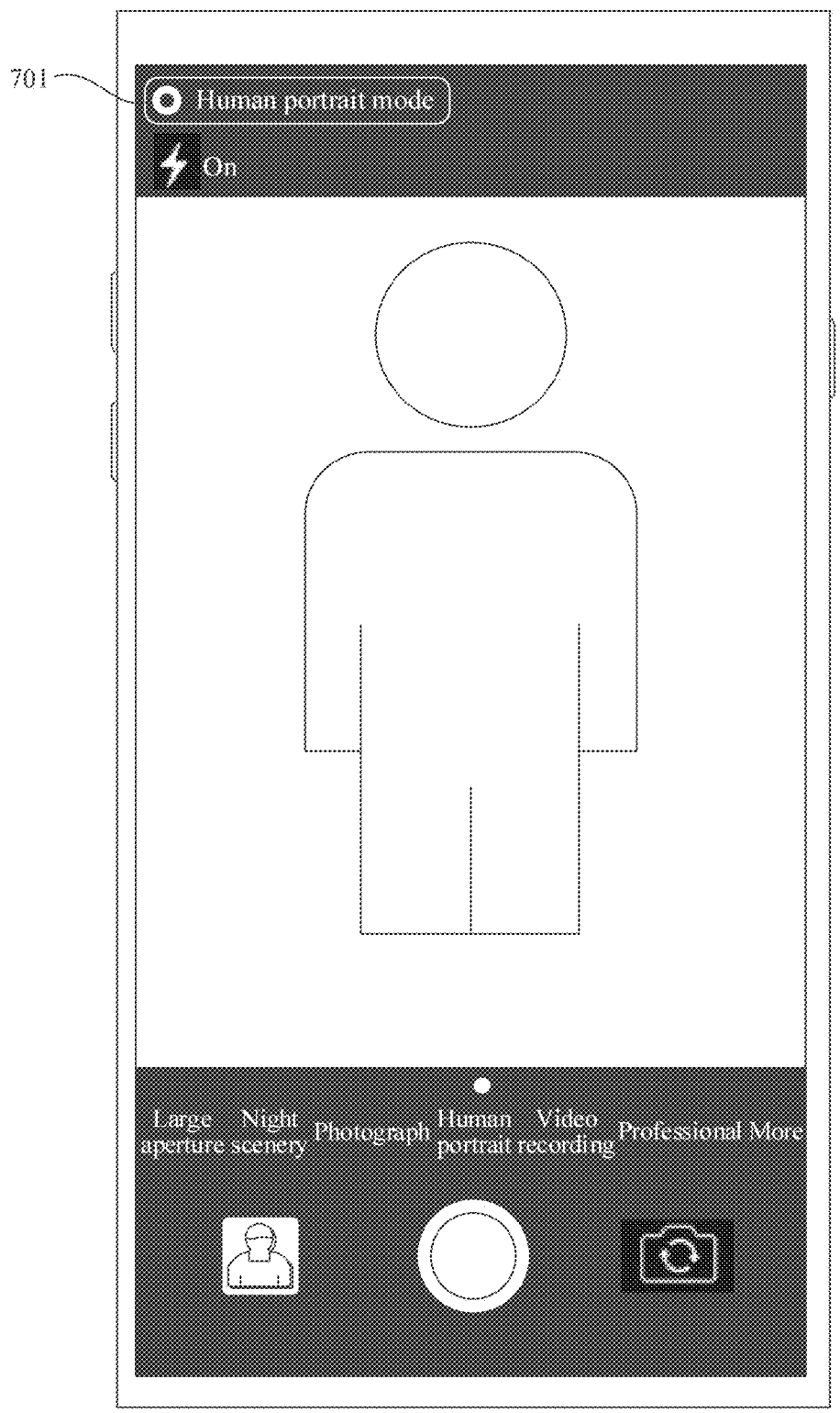

The FIG. 7(*b*) is a partial enlarged view of an area in which the second interface element 701 shown in FIG. 7(*a*) is located. As shown in FIG. 7(*b*), the display position of the second interface element 701 encircles the through hole provided in the display, where a camera 702 is disposed in the through hole. The second interlace element 702 includes prompt information 703, for example, text "human portrait mode". Certainly, the prompt information 703 may alternatively be another image or character that can refer to the mode. The prompt information 703 is used to prompt the user that the human portrait mode is enabled. It may be understood that, because the second interface element 701 includes the prompt information 703 used to prompt the user that the corresponding mode is enabled, a display area of the second interface element 701 may be greater than the display area of the first interface element 602.

In some other embodiments of this application, if the electronic device runs the first application program, there is a default setting of the mode of the first application program. That is, after receiving the first operation described in S402, the electronic device, at the same time of running the first application program, enables a default mode of the first application program. Correspondingly, in response to the first operation in S402, the electronic device displays, on the display, the second interface that does not include the first interface element but includes the second interface element, where the second interface element includes prompt information used to prompt the user that the default mode is enabled. The display position of the second interface element encircles the through hole provided in the display. The display area of the first interface element is greater than the display area of the first interface element in S401.

For example, the example in which the first application program is Camera is used. After the user performs a lapping operation on the icon of Camera displayed on the home screen, the electronic device may run the Camera application and enable the default mode, for example, the photographing mode of Camera. The electronic device displays the interface of Camera, and the interface includes the second interface element, namely, the interface element in the shape of the capsule. The display position of the interface element in the shape of the capsule encircles the through hole provided in the display, and the camera is disposed in the through hole. The interface element in the shape of the capsule may include prompt information, for example, text "photographing mode" (or another image or character that can refer to the mode), used to prompt the user that the photographing mode is enabled.

Certainly, in the embodiments of this application, the second interface element displayed by the electronic device is not limited to the interface element in the shape of the capsule shown in FIG. 7(*a*) and FIG. 7(*b*), and the second interface element may be an interface element of another shape, another size, and another color. In addition, the second interface element may be displayed on the display statically, or may be displayed on the display dynamically. For example, the second interface element is displayed on the display in a form of a breathing light. This is not limited in the embodiments of this application.

In some embodiments, the electronic device can change, based on a scene transition effect, the first interface element that is in the second interface and that is displayed in the display area encircling the through hole provided in the display to the second interface element. In this way, the interface element can better prompt a current status of the electronic device to the user, thereby further improving user experience. The scene transition effect may be predefined or may be manually set by the user. This is not limited herein.

In this way, the abruptness of hardware (for example, the camera) that is disposed in the through hole of the display and that is in the interface displayed on the display can be alleviated. In addition, the electronic device may change, based on a current set mode of the first application program (for example, Camera), the interface element associated with the camera, and prompt the current status to the user by using the changed interface element. When the first application program is Camera, because prompted content is related to a current status of the hardware camera, a manner of performing prompting beside the camera can improve prompting efficiency, so that the user learns of the current working status of the camera more intuitively and quickly, and the intelligence of human-computer interaction is increased. The use experience of the user is improved.

FIG. 8 is a schematic flowchart of another control method according to an embodiment of this application. The method is applied to an electronic device. The electronic device may include a display and hardware such as a camera. A through hole is provided in the display, and the hardware is embedded in the through hole provided in the display. For example, as shown in FIG. 1, the camera is embedded in the display.

As shown in FIG. 8, the method may include the following S801 to S805.

S801. The electronic device displays a first interface on the display, where the first interface includes a first interface element, a display position of the first interface element encircles the through hole provided in the display, and the through hole is configured to accommodate the hardware such as the camera.

For example, the first interface may be a dialing interface. The dialing interface may include a status bar, where the status bar include a first interface element. For example, the first interface element may be the color ring shown in FIG. 5(*a*) and FIG. 5(*b*), and a display position of the first interface element encircles the through hole provided in the display. Detailed descriptions of the first interface element are similar to specific descriptions of corresponding content in S401 in the foregoing embodiment, and details are not described herein again.

S802. The electronic device receives a first operation of making, by a user, a phone call.

S803. The electronic device displays a call interface on the display in response to the first operation, where the call interface includes the first interface element.

For example, the first operation may be a tapping operation performed by the user on a dialing button in the dialing interface. In response to the first operation of the user, the electronic device may make a phone call to a corresponding number and display the call interface on the display. When the electronic device displays the call interface, the first interface element may still be displayed in the display area that encircles the through hole provided in the display.

Figure 9A:
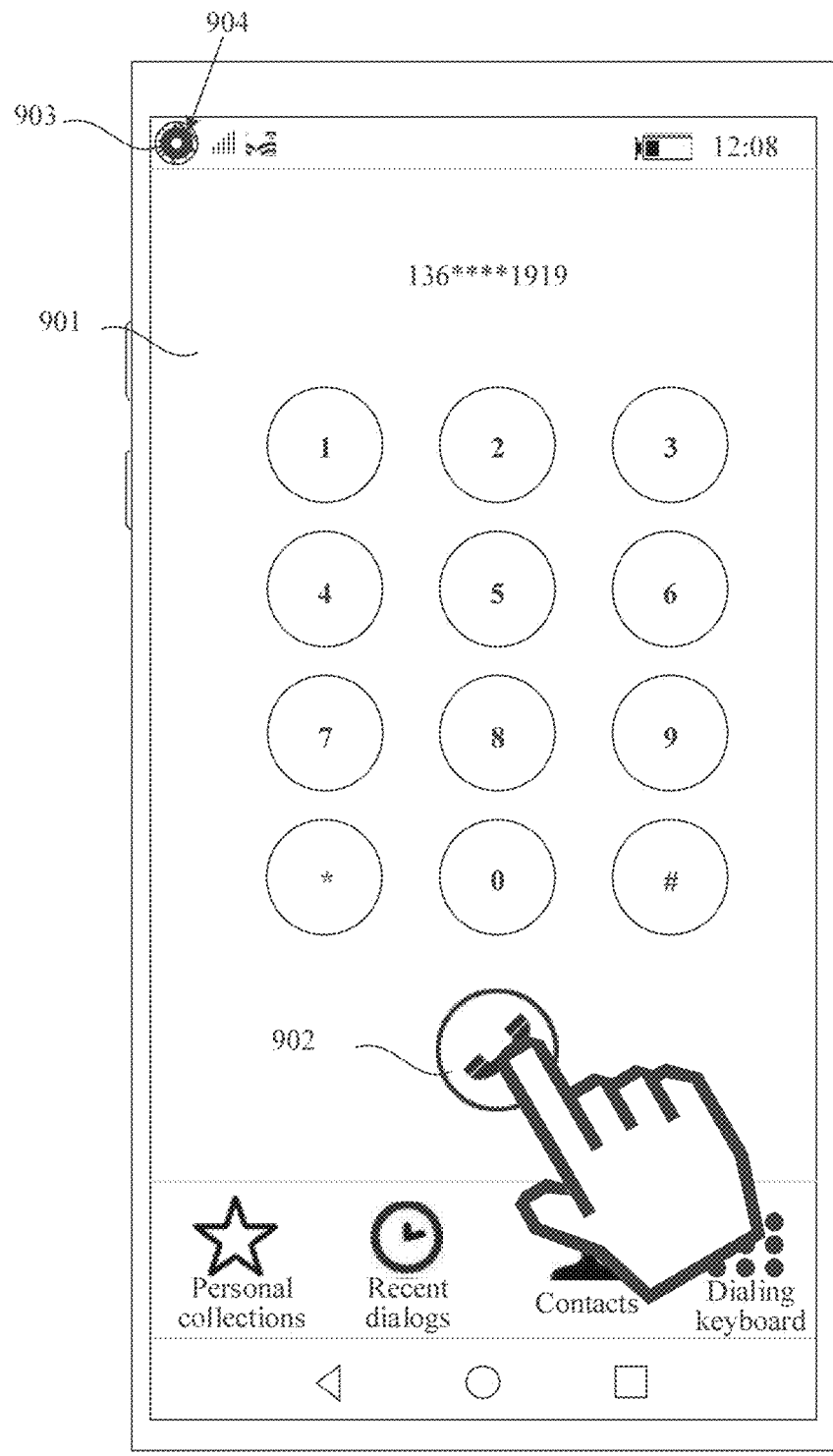
FIG. 9(a) and FIG. 9(b) are schematic diagrams of still some other graphical user interfaces displayed on an electronic device according to an embodiment of this application.
Figure 9B:
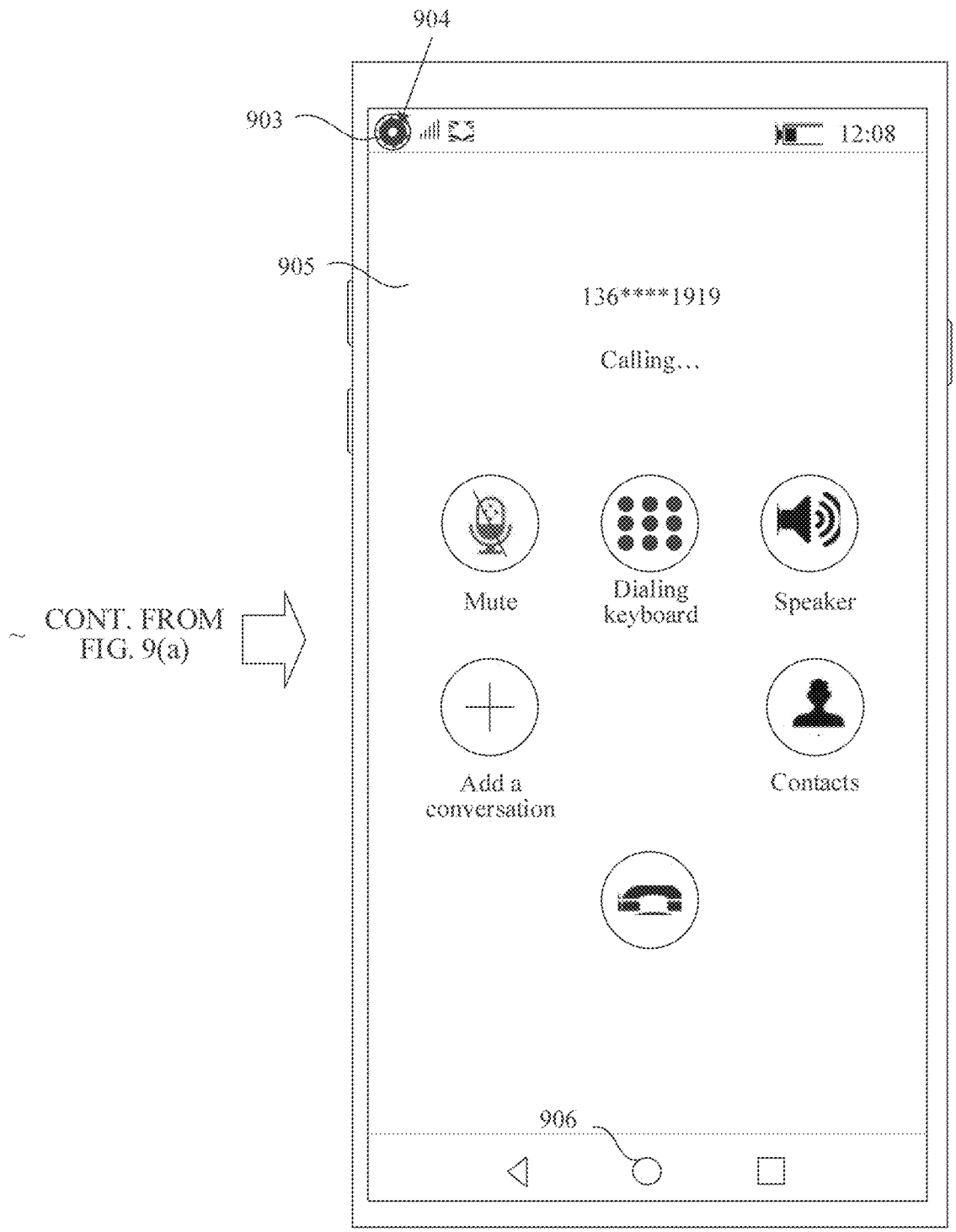

For example, as shown in FIG. 9, an example in which the first interface is the dialing interface, and the through hole of the display is provided on the upper left corner of the display is used. When the user needs to make a phone call, the user may enter a to-be-dialed phone number in a dialing interface 901 shown in FIG. 9(*a*), and performs a tapping operation on a dialing button 902. A status bar of the dialing interface 901 shown in FIG. 9(*a*) includes a first interface element 903. A display position of the first interface element 903 encircles the through hole provided in the display, where a camera 904 is disposed in the through hole. In response to the tapping operation performed by the user on the dialing button 902, the electronic device may make a phone call to a corresponding number and display a call interface 905 on the display. As shown in FIG. 9(*b*), the status bar of the call interface 905 also includes the first interface element 903 of which the display position encircles the through hole. The camera 904 is disposed in the through hole. For a specific example of the first interface element 903, refer to the color ring shown in FIG. 5(*a*) and FIG. 5(*b*) in the foregoing embodiment. Details are not described herein again.

S804. The electronic device receives a second operation performed by the user.

The second operation may be a triggering operation performed by the user on a home screen key of the electronic device. The home screen key may be a physical key or may be a virtual key. Alternatively, the second operation may be a triggering operation performed by the user on a home (home) button included in a navigation bar. Both of the home screen key and the home button may be used to receive an instruction of the user, to return an interface currently displayed on the display to the home screen.

Alternatively, the second operation may be a triggering operation used to open another application program. For example, when the call interface is currently displayed on the display, and the electronic device receives a notification message of an application program, the electronic device can display, on the display, a notification bar including the notification message, and the second operation may be a tapping operation performed by the user on the notification bar.

S805. The electronic device displays a second interface on the display in response to the second operation, where the second interface is different from the call interface, the second interface includes a second interface element, the second interface element includes prompt information used to prompt that the electronic device is currently in a call or prompt call duration, a display position of the second interface element encircles the through hole disposed in the display, and a display area of the second interface element is greater than a display area of the first interface element.

After receiving the second operation, the electronic device may display, on the display, the second interface that is different from the call interface. For example, the foregoing second operation is a triggering operation performed by the user on the home screen key or the home button, and the second interface is the home screen. Alternatively, the second operation is a tapping operation performed by the user on the notification bar including a notification message of an application program, and the second interface is an interface of the application program.

In addition, the second interface includes a second interface element. For example, in the status bar of the second interlace, the second interface element is displayed in a display area encircling the through hole of the display. A display area of the second interface element may be greater than the display area of the first interface element, and the second interface element may include prompt information, where the prompt information may be used to prompt the user that the electronic device is currently in a call, or to prompt call duration of the current call to the user.

Figure 10A:
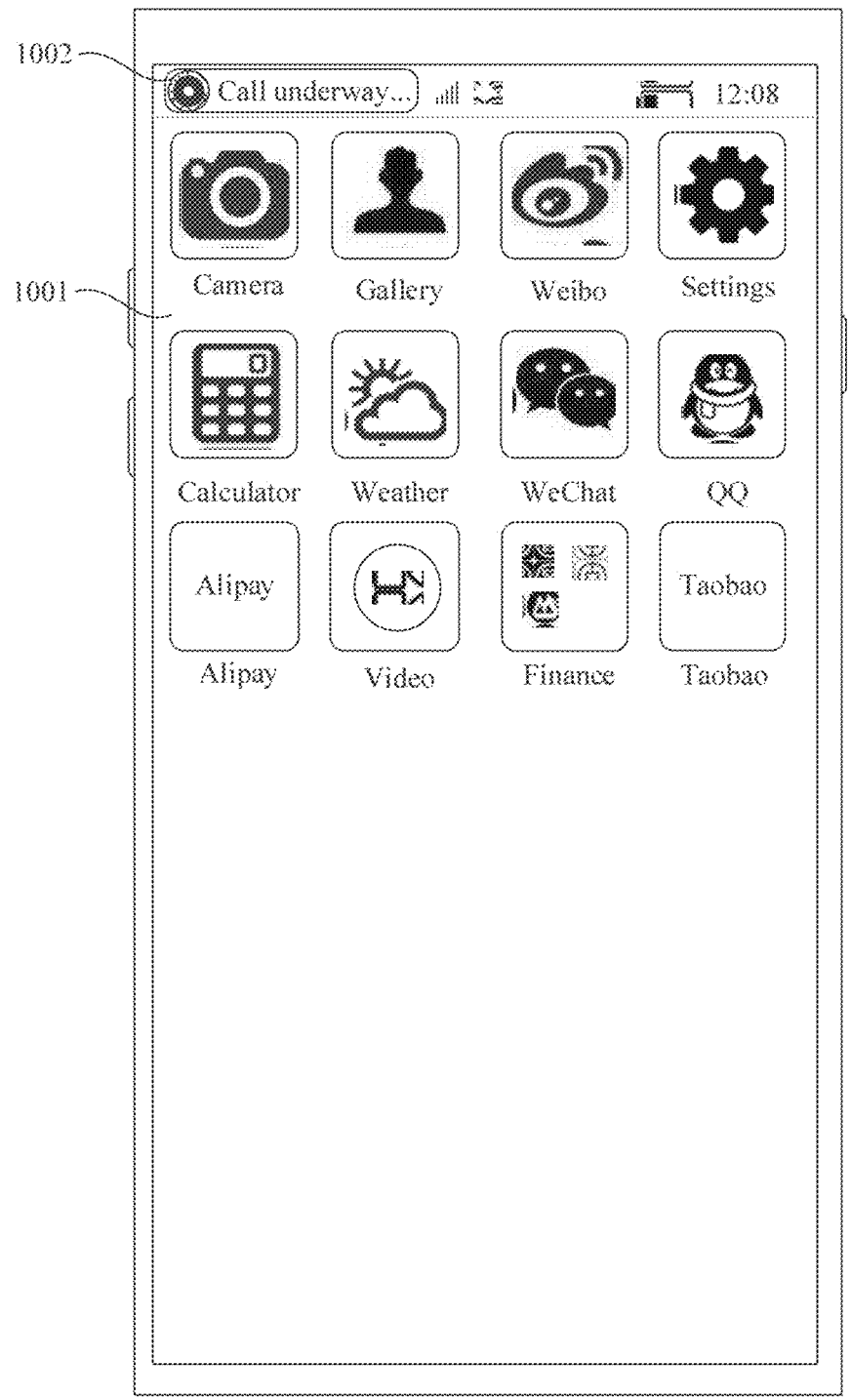
FIG. 10(a) and FIG. 10(b) are schematic diagrams of still some other graphical user interfaces displayed on an electronic device according to an embodiment of this application.
Figure 10B:
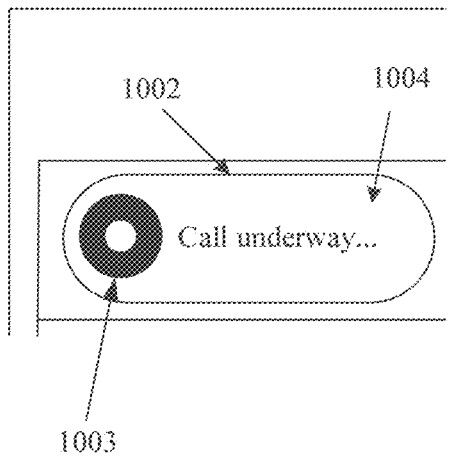

For example, with reference to FIG. 9, an example in which the second operation is a triggering operation performed on the home button included in the navigation bar is used. In a process of making a phone call by using the electronic device, if the user wants to open the home screen of the electronic device, the user may perform the triggering operation on the home button 906 included in the navigation bar in the call interface 905 shown in FIG. 9(*b*). As shown in FIG. 10(*a*), in response to the triggering operation, the electronic device may display a home screen 1001 on the display, where a status bar of the home screen 1001 includes a second interface element 1002, for example, an interface element in a shape of a capsule, as shown in FIG. 10(*a*).

The FIG. 10(*b*) is a partial enlarged view of an area in which the second interface element 1002 shown in FIG. 10(*a*) is located. As shown in FIG. 10(*b*), the display position of the second interface element 1002 encircles the through hole provided in the display, where a camera 1003 is disposed in the through hole. The second interface element 1002 includes prompt information 1004, for example, text "call underway . . . " (or another image or symbol that can prompt that the call is underway). The prompt information 1004 is used to prompt that the electronic device is currently in a call. It may be understood that, because the second interface element 1002 includes the prompt information used to prompt the user that the call is underway, a display area of the second interface element 1002 may be greater than the display area of the first interface element 903. In addition, the second interface element 1002 may further include prompt information used to prompt call duration, to facilitate the user to learn of call duration until a current moment.

Certainly, in this embodiment of this application, the second interlace element displayed by the electronic device is not limited to the interface element in the shape of the capsule shown in FIG. 10(*a*) and FIG. 10(*b*), and may be an interface element of another shape, another size, and another color.

In addition, the second interlace element may be displayed on the display statically, or may be displayed on the display dynamically. For example, the second interface element is displayed on the display in a form of a breathing light. This is not limited in this embodiment of this application.

In addition, when the second interface element is displayed in the status bar, if the display position of the second interface element overlaps a display position of another interface element in the status bar, the second interface element may cover the interface element. For example, if the display position of the second interface element overlaps a display position of an interface element that is used to prompt a signal condition of a network to which the electronic device is connected and that is in the status bar, the second interface element may cover the interface element. Alternatively, the electronic device may change the display position of the interface element that overlaps the display position of the second interface element, provided that a changed display position does not overlap the display position of the second interface element. For example, if the display position of the second interface element overlaps a display position of an interface element that is used to prompt a signal condition of a network to which the electronic device is connected and that is in the status bar, when the second interface element is displayed, the electronic device may change the display position of the interface element to an area adjacent to the display position of the second interface element, so that the second interface element and the another interface element can be simultaneously displayed in the status bar of the display, for example, as shown in FIG. 10(*a*).

In some embodiments, the electronic device may change, based on a scene transition effect, the first interface element displayed in the display area encircling the through hole of the display to the second interface element, for example, change, based on the scene transition effect, the first interface element 903 to the second interface element 1002. In this way, the interface element can better prompt a current status of the electronic device to the user, thereby further improving user experience. The scene transition effect may be predefined or may be manually set by the user. This is not limited herein.

It should be noted that, the foregoing S801 to S805 describe how to better prompt the current status of the electronic device by using the interface element, by using an example in which the user is using the electronic device to make a phone call, an interface displayed on the display of the electronic device is not the call interface, and the electronic device prompts, by displaying the interface element in the shape of the capsule in the display area encircling the through hole of the display, the user that a call is underway. Similarly, for some functions that the electronic device runs in the background, the electronic device may also prompt, by using an interface element displayed in the display area encircling the through hole of the display, to a user, functions being run in the background, to better prompt the current status of the electronic device to the user.

For example, if the home screen or an interface of an application program is displayed on the display of the electronic device, and a voice recording function (or a screen recording function) is being used in the background, the electronic device may display an interface element, for example, the foregoing interface element in the shape of the capsule, in the display area encircling the through hole of the display. The interface element includes prompt information used to prompt that the voice recording function (or the screen recording function) is being used. For another example, if an interface of an application program is displayed on the display of the electronic device, and the application program is acquiring location information of the user in the background or acquires the location information of the user alter the electronic device enables a driving mode, the electronic device may display an interface element, for example, the foregoing interface element in the shape of the capsule, in the display area encircling the through hole of live display. The interface element includes prompt information used to prompt that the location information of the user is being acquired.

In this way, the abruptness of hardware (for example, the camera) that is disposed in the through hole of the display and that is in the interface displayed on the display can be alleviated. In addition, the electronic device may change the interface element associated with the camera, and the changed interface element may be used to prompt to the user the current status, namely, that the call is underway. A manner of performing prompting beside the camera can improve prompting efficiency, so that the user more intuitively and quickly learns that the electronic device is currently in a call, the intelligence of human-computer interaction is increased, and use experience of the user is improved.

In addition, in this embodiment of this application, an interface element associated with the camera, for example, the interface element in the shape of the capsule (the display position of the interface element encircles the through hole provided in the display), may be different depending on different scenarios. The interface element may be used to prompt information of the electronic device that the user currently needs to pay attention to, or used to prompt information that the electronic device considers to be relatively important at present.

For example, for an interface element that is displayed in the status bar and that is used to prompt a battery level of the electronic device, when the battery level of the electronic device is greater than a value, the electronic device may display the interface element used to prompt the battery level of the electronic device out of the interface element associated with the camera. When the electronic device determines that the battery level of the electronic device is less than the value, to make the user focus on the information, the electronic device may display the interface element used to prompt the battery level of the electronic device within the interface element associated with the camera. For example, when the battery level of the electronic device is less than the value, the electronic device display the interface element in the shape of the capsule in the area encircling the through hole of the display, where the interface element in the shape of the capsule includes the interface element used to prompt the battery level of the electronic device. If the user connects the electronic device to a charger for charging, when the battery level of the electronic device is greater than the value, the electronic device may move the interface element used to prompt the battery level of the electronic device out of the interface element in the shape of the capsule, to be specific, display the interface element used to prompt the battery level of the electronic device out of the interface element associated with the camera.

Similarly, if the user sets an alarm, when a difference between current system time and time of the set alarm is greater than a threshold, the electronic device may display an interface element used to prompt system time out of the interface element associate with the camera. When the electronic device determines that the difference between the current system time and the time of the set alarm is less than the threshold, to be specific, the time of the set alarm is approaching, the electronic device may display the interface element used to prompt the system time within the interface element associated with the camera, to be specific, display the interface element used to prompt the system time within the interface element in the shape of the capsule encircling the through hole of the display. If the time of the set alarm has passed, the electronic device may move the interface element used to prompt the system time out of the interface element in the shape of the capsule, to be specific, display the interface element used to prompt the system time out of the interface element associated with the camera. Similarly, another interface element included in the status bar, for example, an interface element used to prompt a signal condition of a network to which the electronic device is connected or an interface element used to prompt traffic to the user, may be displayed at different positions of the interface element associated with the camera (for example, displayed out of the interface element associated with the camera, or displayed within the interface element associated with the camera) in different situations. In this way, the user can more intuitively and quickly learn of information that the electronic device wants the user to pay-attention to, and the intelligence of human-computer interaction is increased.

Figure 11:
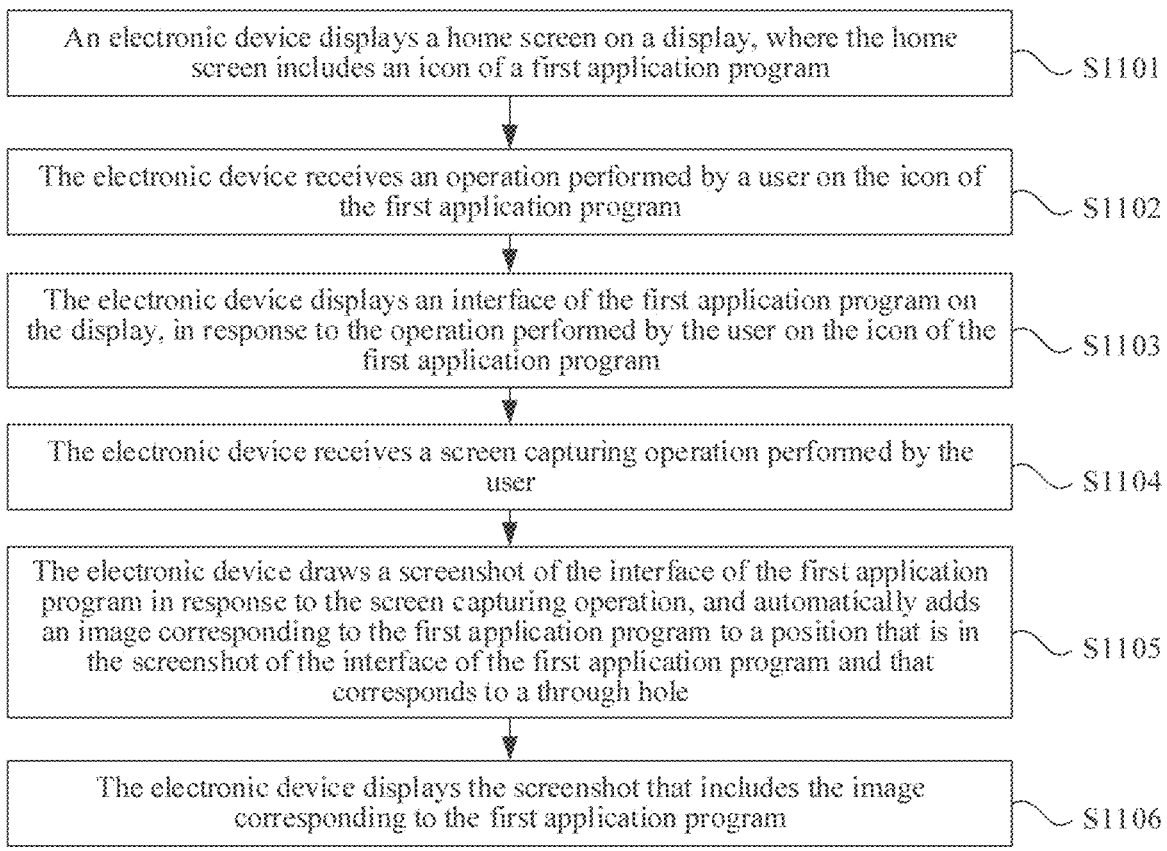
FIG. 11 is a schematic flowchart of a screenshot generating method according to an embodiment of this application.
Figure 12A:
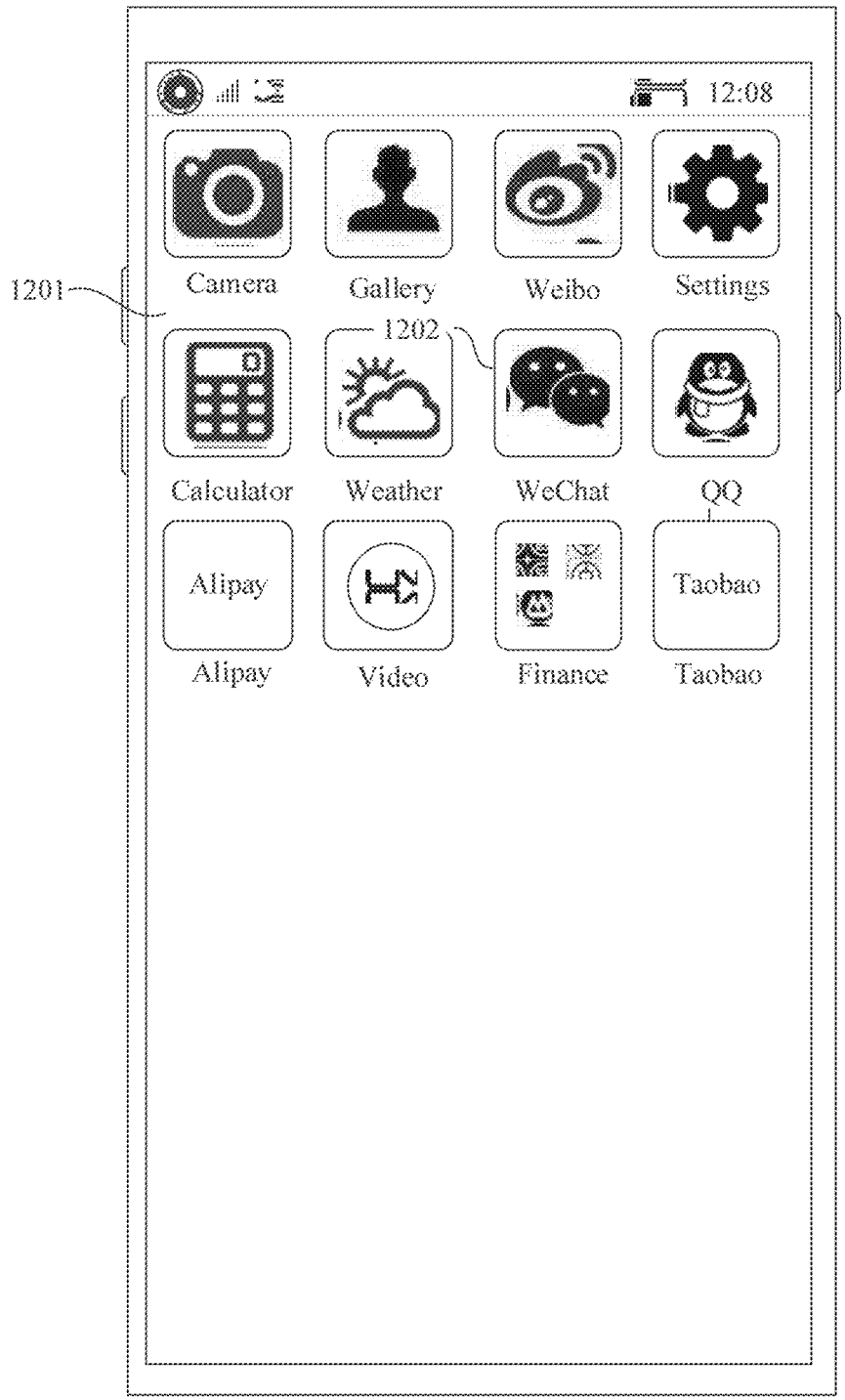
FIG. 12(a), FIG. 12(b), FIG. 12(c), FIG. 12(d), and FIG. 12(e) are schematic diagrams of still some other graphical user interfaces displayed on an electronic device according to an embodiment of this application.
Figure 12B:
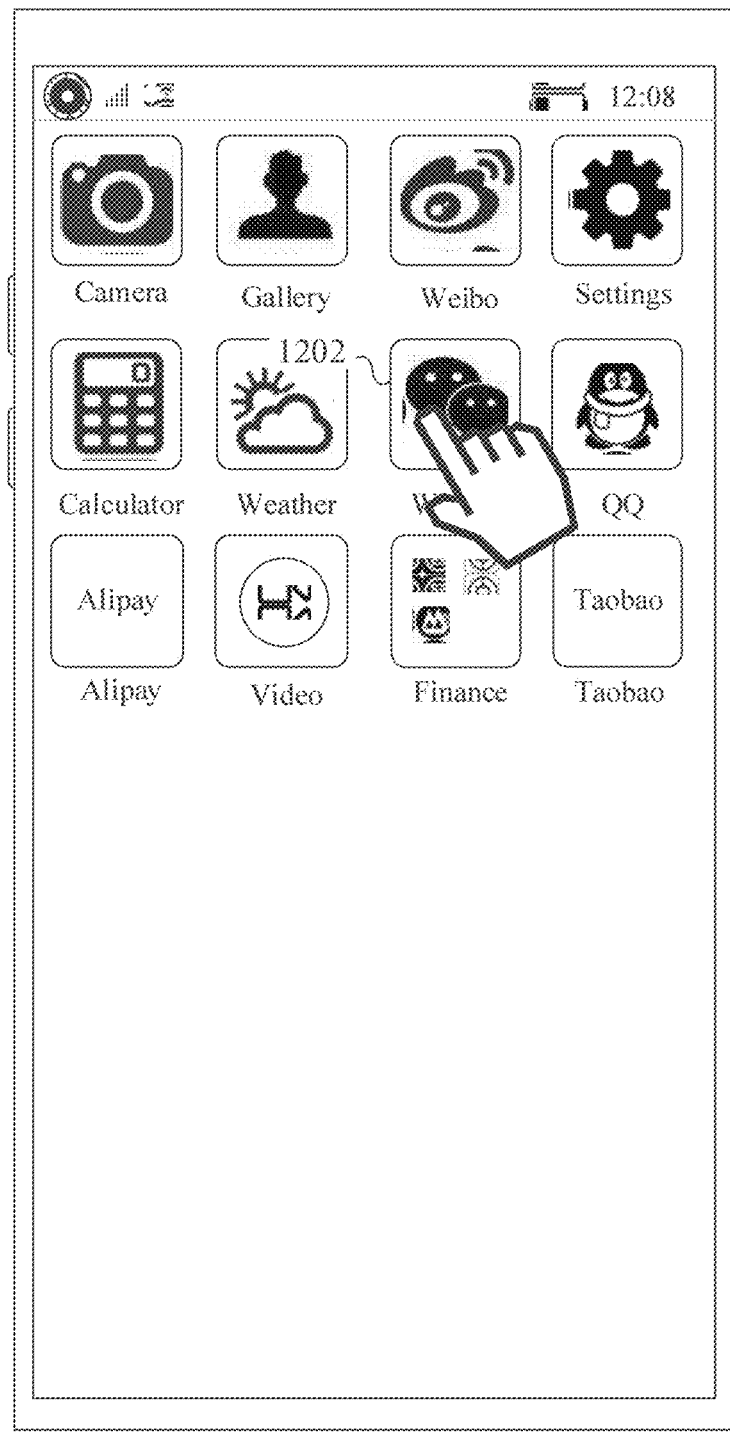
Figure 12C:
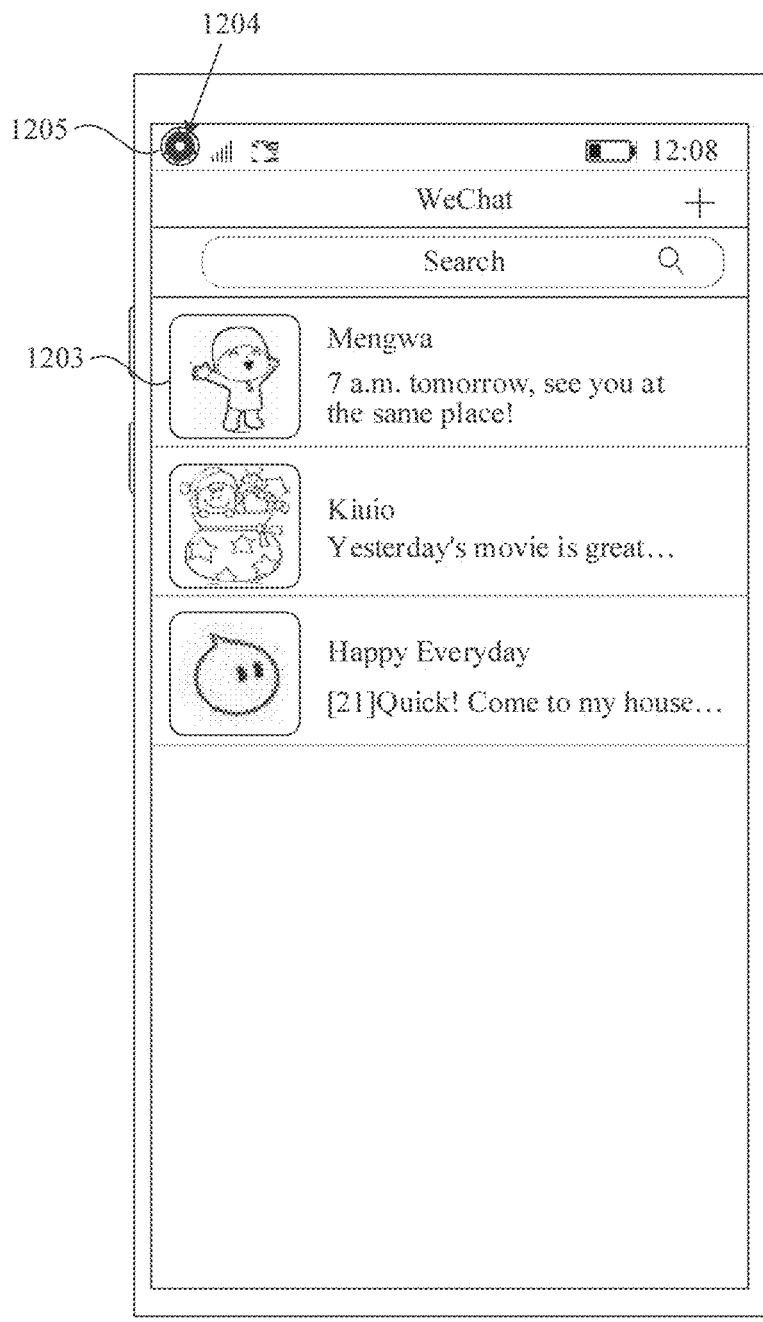
Figure 12D:
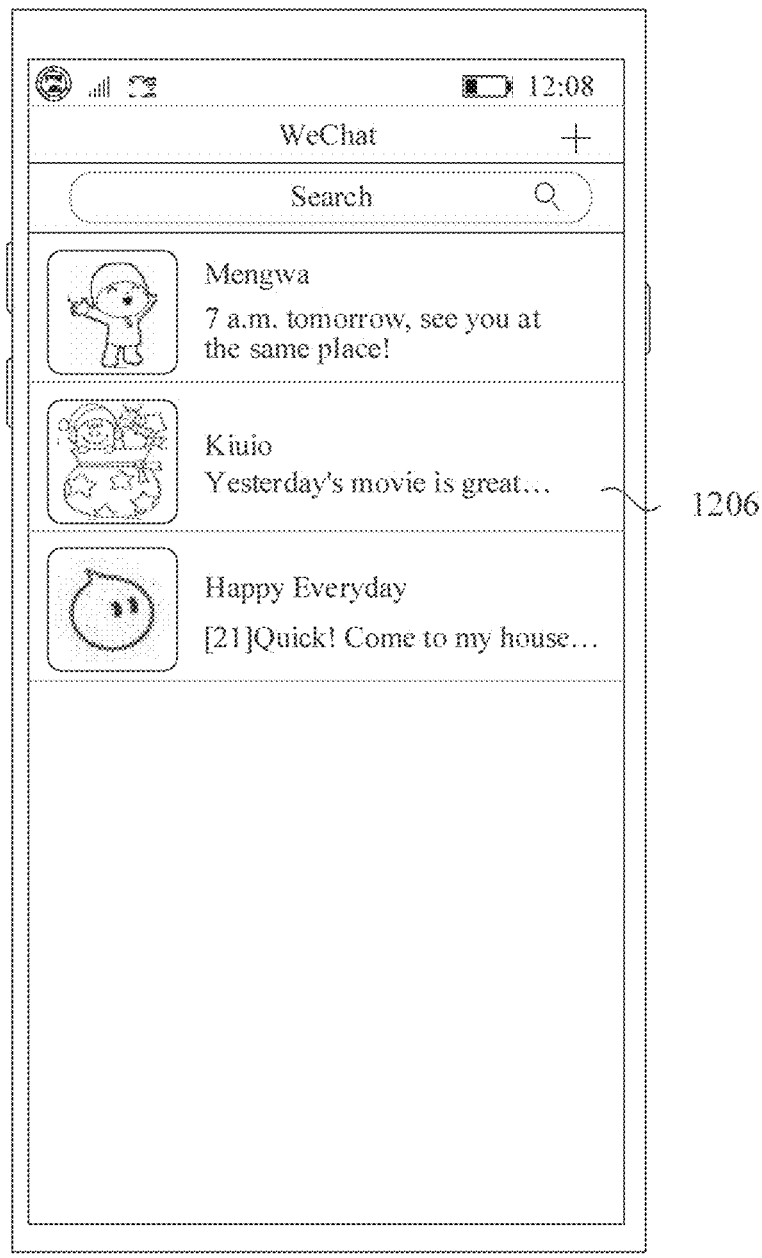
Figure 12E:
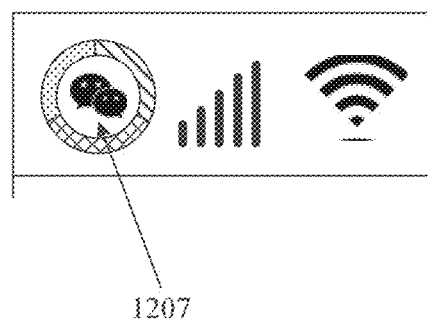

FIG. 11 is a schematic flowchart of a screenshot generating method according to an embodiment of this application. The method may be applied to an electronic device. The electronic device includes a display and hardware such as a camera. A through hole is provided in the display, and the hardware is embedded in the through hole provided in the display. For example, as shown in FIG. 1, the camera is embedded in the display.

As shown in FIG. 11, the method may include the following S1101 to S1106.

S1101. The electronic device displays a home screen on the display, where the home screen includes an icon of a first application program.

S1102. The electronic device receives an operation performed by a user on the icon of the first application program.

For example, when the user wants to use the first application program, the user may perform a tapping operation on the icon of the first application program displayed on the home screen.

S1103. The electronic device displays an interface of the first application program on the display, in response to the operation performed by the user on the icon of the first application program.

For example, after receiving the operation performed by the user on the icon of the first application program, the electronic device may display the interface, such as a home interface, of the first application program on the display.

S1104. The electronic device receives a screen capturing operation performed by the user.

In a process of using the electronic device, if the user is interested in an interface displayed on the display of the electronic device, such as the interface of the first application program, and wants to save content in the currently displayed interface, the user may use a screen capturing function of the mobile phone and store, in a form of a screenshot, the content that the user wants to save. The user may perform a screen capturing operation to trigger the electronic device to enable the screen capturing function.

The foregoing screen capturing operation may be an operation performed by the user on a functional key (for example, a volume control key: a volume "+" key or a volume "−" key, or a power key), or a combination of functional keys (for example, a combination of the volume "+" key and the power key), or may be an operation performed by the user on a virtual key of the electronic device, or may be a preset gesture entered by the user, such as a double tapping gesture.

S1105. The electronic device draws a screenshot of the interface of the first application program in response to the screen capturing operation, and automatically adds an image corresponding to the first application program to a position that is in the screenshot of the interface of the first application program and that corresponds to the through hole.

The image corresponding to the first application program may be the icon of the first application program or may be a part of the icon of the first application program.

S1106. The electronic device displays the screenshot that includes the image corresponding to the first application program.

After receiving the foregoing screen capturing operation, the electronic device may draw a screenshot. A specific screenshot drawing method is implemented by the prior art, for example, Canvas or SVG. Details are not described herein again.

The screenshot is a screenshot of the interface of the first application program shown in S1103. Because the through hole is provided in the display, a position of the through hole displays no content in the view of the user. If the position that corresponds to the through hole and that is in the screenshot includes content, the user may mistakenly consider that a fault occurs in the electronic device. In this embodiment, when the screenshot is drawn, the image corresponding to the first application program is automatically added to the position corresponding to the through hole of the display, for example, a part of the icon of the first application program is used as the image and is added to the screenshot.

For example, with reference to FIG. 12, an example in which the first application program is WeChat is used. As shown in FIG. 12(a), the electronic device displays a home screen 1201, where the home screen includes an icon 1202 of WeChat. As shown in FIG. 12(b), when the user wants to use WeChat, the user may perform a tapping operation on the icon 1202 of WeChat. In addition, to alleviate the abruptness of the camera in the interface displayed on the display, the display position encircling the through hole of the display includes a first interface element, for example, a color ring. As shown in FIG. 12(c), in response to the tapping operation performed by the user on the icon 1202 of WeChat the electronic device displays an interface 1203 of WeChat on the display, where the interface 1203 of WeChat includes a status bar, and a display position encircling the through hole of the display in the status bar includes a first interface element 1204, for example, the color ring. A camera 1205 is disposed in the through hole of the display. When the user wants to save, in a form of a screenshot, content currently displayed on the display, the user may perform a screen capturing operation, for example, pressing the volume "+" key and the power key of the electronic device simultaneously. In response to the screen capturing operation, the electronic device may generate a screenshot of the interface of WeChat, and automatically add an image corresponding to WeChat to a position corresponding to the through hole of the display. The electronic device may display a screenshot 1206 including the image corresponding to WeChat. For example, the screenshot 1206 is shown in FIG. 12(d). A partial enlarged view of the position that corresponds to the through hole and that is in the screenshot 1206 shown in FIG. 12(d) is shown in FIG. 12(e). As shown in FIG. 12(e), the position that corresponds to the through hole provided in the display and that is in the screenshot 1206 includes an image 1207, where the image 1207 is a part of the icon of WeChat.

In some embodiments, for a second application program in the electronic device, the home screen of the electronic device may further include an icon of the second application program. The user may further perform an operation on the icon of the second application program, so that the electronic device can display an interface of the second application program on the display. When the user is interested in the interface of the second application program, the user may also perform a screen capturing operation, and at this time, in response to the screen capturing operation, the electronic device may draw a screenshot of the interface of the second application program, and automatically add an image corresponding to the second application program to the position that corresponds to the through hole and that is in the screenshot of the interface of the second application program, and a screenshot including the image is finally displayed. For example, the second application program is Alipay, the electronic device may generate a screenshot of the interface of Alipay, and may automatically add an image corresponding to Alipay, for example, an image including a word "Alipay" in the icon of Alipay, to the position corresponding to the through hole of the display. That is, a position that corresponds to the through hole of the display and that is in the finally displayed screenshot includes the image corresponding to Alipay.

Figure 13A:
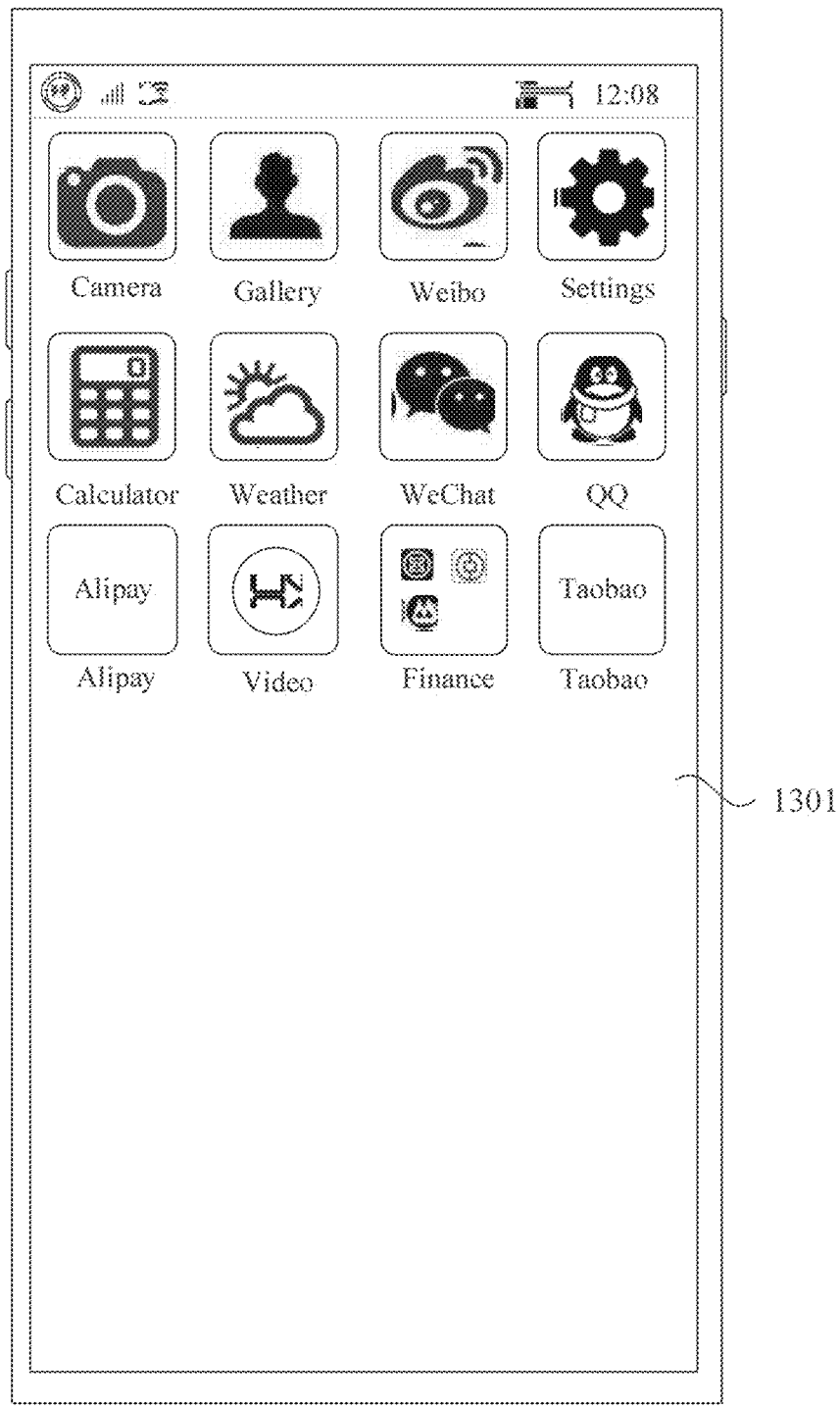
FIG. 13(a) and FIG. 13(b) are schematic diagrams of still some other graphical user interfaces displayed on an electronic device according to an embodiment of this application.
Figure 13B:
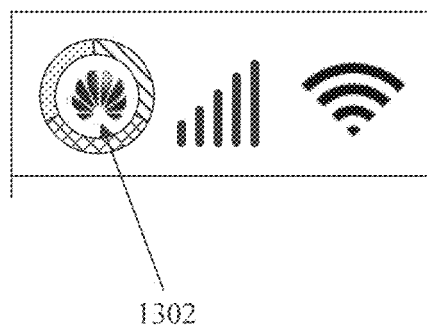

In some embodiments, when the interface currently displayed on the display of the electronic device is the home screen, after receiving the screen capturing operation performed by the user, the electronic device, in response to the screen capturing operation, draws a screenshot of the home screen, and automatically adds a watermark to a position that corresponds to the through hole of the display and that is in the screenshot of the home screen. For example, with reference to FIG. 5 in the foregoing embodiment, the home screen is currently displayed on the display of the electronic device, and in the status bar included in the home screen, the display position encircling the through hole of the display includes the first interface element, for example, the color ring. When the user wants to save, in a form of a screenshot, content currently displayed on the display, the user may perform a screen capturing operation. In response to the screen capturing operation, the electronic device may draw a screenshot of the home screen, and automatically add a watermark (for example, if the electronic device is a Huawei mobile phone, the watermark is a logo of Huawei) to the position that corresponds to the through hole of the display and that is in the screenshot of the home screen. For example, a finally displayed screenshot 1301 is shown in FIG. 13(*a*). A partial enlarged view of an area that corresponds to the camera and that is in the screenshot 1301 shown in FIG. 13(*a*) is shown in FIG. 13(*b*). As shown in FIG. 13(*b*), the position that corresponds to the through hole provided in the display and that is in the screenshot 1301 includes a watermark 1302, where for example, the watermark 1302 is the logo of Huawei in the figure. The watermark may be a watermark related to a brand of the electronic device, to increase a feature of the brand.

In some other embodiments, when the home screen currently displayed on the display includes an interlace element of which a display position encircles the through hole of the display, and prompt information included in the interface element is prompt information of an application program, after the electronic device receives the screen capturing operation performed by the user, the electronic device, in response to the screen capturing operation, the electronic device generates a screenshot of the home screen, and automatically adds an image corresponding to the application program to a position that corresponds to the through hole and that is in the screenshot of the home screen.

Figure 14A:
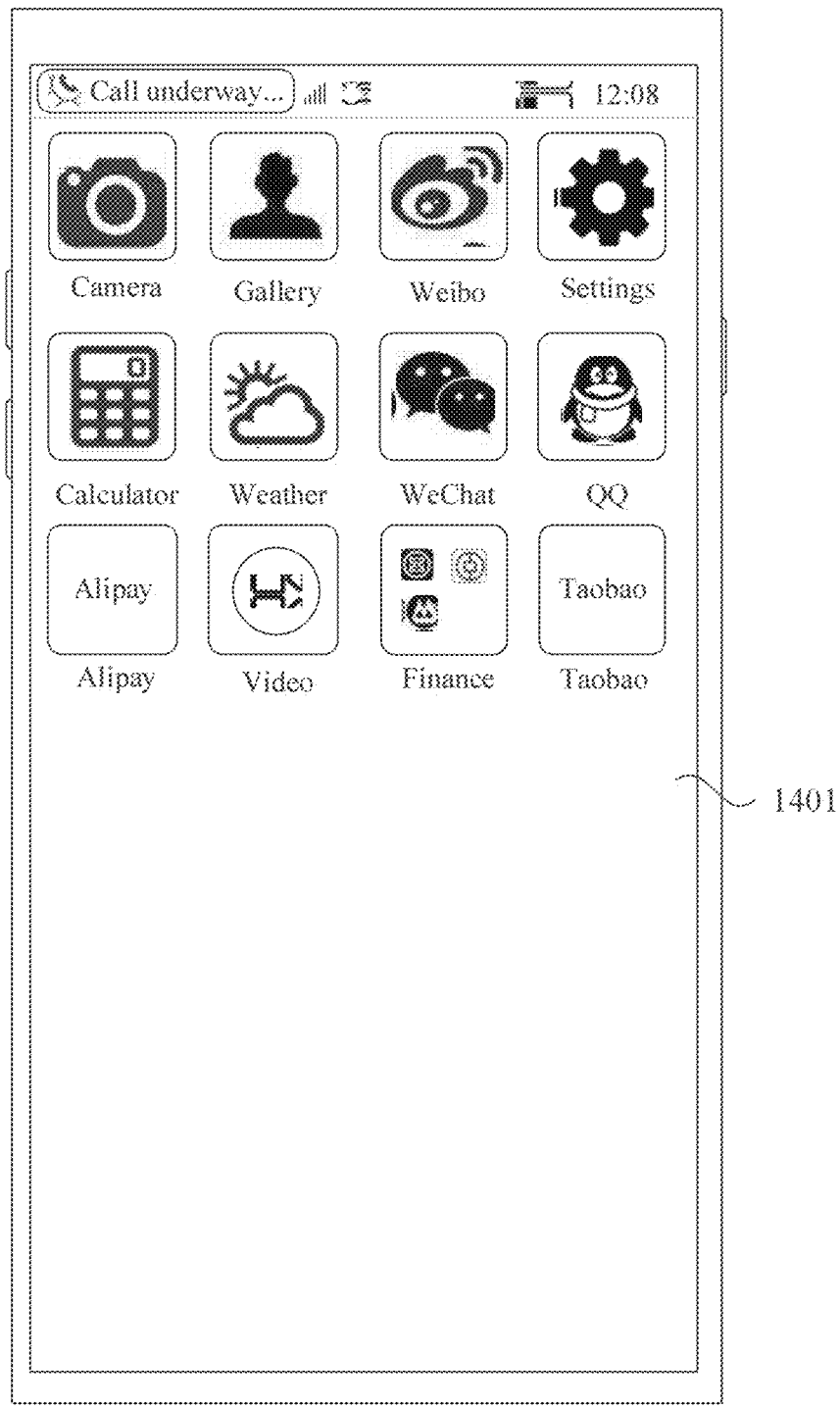
FIG. 14(a) and FIG. 14(b) are schematic diagrams is a schematic diagram of still some other graphical user interfaces displayed on an electronic device according to an embodiment of this application.
Figure 14B:
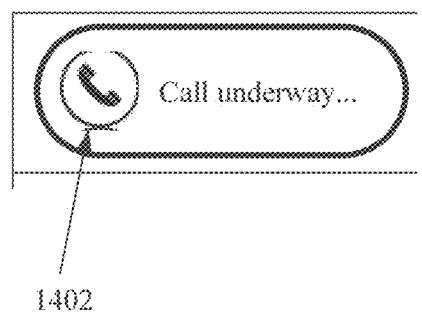

For example, with reference to FIG. 10 in the foregoing embodiment, the home screen is currently displayed on the display of the electronic device, and in the status bar included in the home screen, the display position encircling the through hole of the display includes the second interface element, for example, an interface element in a shape of a capsule. The second interface element includes prompt information used to prompt that the electronic device is currently in a call. The prompt information is prompt information of a phone application in the electronic device. When the user wants to save, in a form of a screenshot, content currently displayed on the display, the user may perform a screen capturing operation. In response to the screen capturing operation, the electronic device may draw a screenshot of the home screen, and automatically add an image corresponding the phone application to the position that corresponds to the through hole and that is in the screenshot of the home screen. The electronic device may display a screenshot 1401 including the image. For example, the screenshot 1401 is shown in FIG. 14(*a*). A partial enlarged view of an area that corresponds to the camera and that is in the screenshot 1401 shown in FIG. 14(*a*) is shown in FIG. 14(*b*). As shown in FIG. 14(*b*), the position that corresponds to the through hole provided in the display and that is in the screenshot 1401 includes an image 1402. The image 1402 is a part of an icon of Phone.

Similarly, when the interface currently displayed on the display is an interface element of the first application program, the interface of the first application program includes an interface element of which a display position encircles the through hole of the display, and prompt information included in the interface element is prompt information of the second application program, after receiving the screen capturing operation performed by the user, the electronic device, in response to the screen capturing operation, draws a screenshot and automatically adds an image corresponding to the second application program, instead of an image corresponding to the first application program, to the position that corresponds to the through hole and that is in the screenshot.

In this way, after receiving the screen capturing operation performed by the user, the electronic device automatically adds an image corresponding to a related application program to the position that corresponds to the through hole provided in the display and that is in the drawn screenshot. The user who views the screenshot can obtain, without a related context, more current system information when the screen is captured, for example, an application program run when the screen is captured, or a current mode. A volume of information included in the screenshot is increased, so that interaction efficiency is improved, and intelligence of human-computer interaction is increased.

It may be understood that to implement the foregoing functions, the electronic device includes hardware structures and/or software modules for performing the various corresponding functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

The embodiments of this application further provides an electronic device to implement the foregoing methods. Specifically, functional modules of the electronic device may be divided. For example, the functional modules may be divided corresponding to the functions. Alternatively, two or more functions may be integrated into one processing module. The integrated module may be implemented in a form of hardware, or may be implemented in a form of a software functional module. It should be noted that, in this embodiment of this application, module division is exemplary, and is merely a logical function division. In actual implementation, another division manner may be used.

Figure 15:
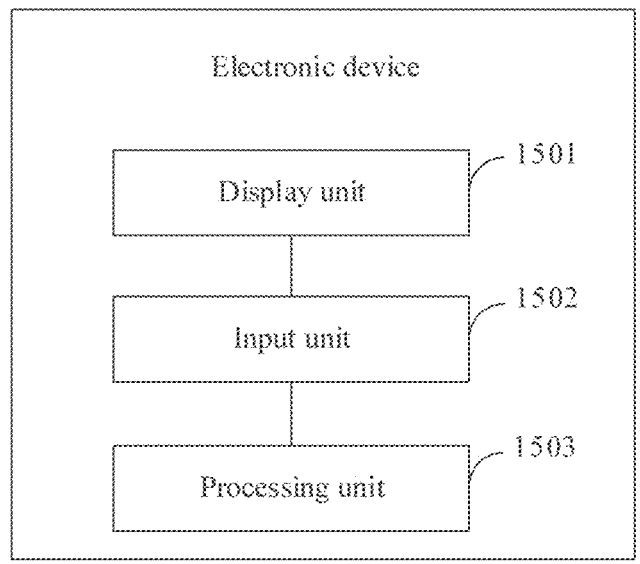
FIG. 15 is a schematic composition diagram of an electronic device according to an embodiment of this application.

When the functional modules are divided according to the corresponding functions, FIG. 15 is a possible schematic structural diagram of the electronic device in the foregoing embodiments. The electronic device may include a display unit 1501, an input unit 1502, and a processing unit 1503.

The display unit 1501 is configured to support the electronic device in performing the displaying operations in S401, S403, and S405 in the foregoing embodiments, S801, S803, S805, S1101, S1103, S1106, and/or another process used for the technologies described in this specification.

The input unit 1502 is configured to receive input, such as touch input, voice input, gesture input, or a floating operation that the user performs on a displayed interface of the electronic device. For example, the input unit 1502 is configured to support the electronic device in performing S402, S404, S802, S804, S1102, and S1104 in the foregoing method embodiments, and/or another process used for the technologies described in this specification. The input unit 1502 may be a touch screen, or other hardware, or a combination of hardware and software.

The processing unit 1503 is configured to support the electronic device in performing S1105 in the foregoing method embodiment, and/or another process used for the technologies described in this specification.

For all related content of the steps in the foregoing method embodiments, refer to function descriptions of corresponding functional modules, and details are not described herein again.

Certainly, the electronic device includes but is not limited to the foregoing listed unit modules. In addition, functions that the foregoing functional modules can specifically implement include but are not limited to the functions corresponding to the method steps in the foregoing examples. For detailed descriptions of another unit of the electronic device, refer to detailed descriptions of method steps corresponding to the unit, and details are not described herein again in this embodiment of this application.

When an integrated unit is used, the electronic device in the foregoing embodiments may include a processing module, a storage module, and a display module. The processing module is configured to control and manage an action of the electronic device. The display module is configured to display content according to instruction of the processing module. The storage module is configured to store program code and data of the electronic device. Further, the electronic device may include an input module and a communications module. The communications module is configured to support the electronic device in communicating with another network entity, thereby implementing conversation, data exchange, Internet accessing, or another function of the electronic device.

The processing module may be a processor or a controller. The communications module may be a transceiver, an RF circuit, a communications interface, or the like. The storage module may be a memory. The display module may be a screen or a monitor. The input module may be a touch screen, a voice input apparatus, a fingerprint sensor, or the like.

When the processing module is a processor, the communications module is the RF circuit, the storage module is the memory, and the display module is the touch screen, the electronic device provided in this embodiment of this application may be the electronic device shown in FIG. 2. The communications module may not only include the RF circuit, and may further include a Wi-Fi module, an NFC module, and a Bluetooth module. The RF circuit, the NFC module, the Wi-Fi module, the Bluetooth module, and another communications module may be collectively referred to as communications interfaces. The processor, the RF circuit, the display, and the memory can be coupled together by using a bus.

Figure 16:
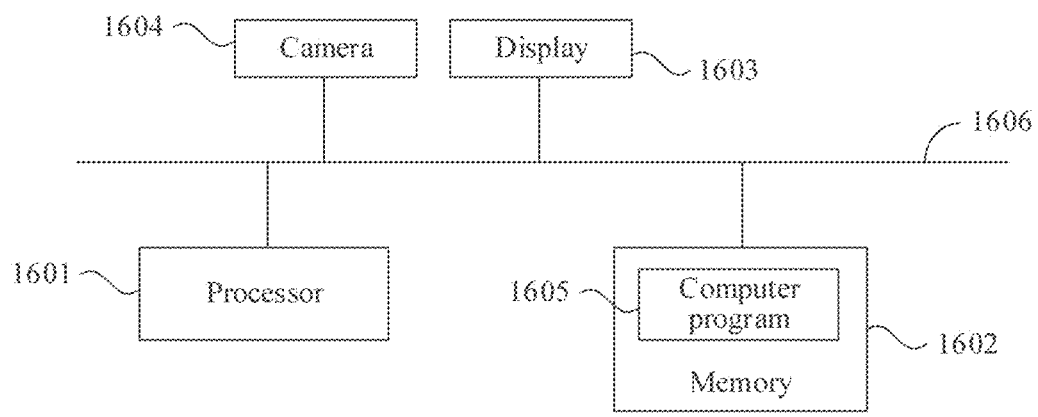
FIG. 16 is a schematic composition diagram of another electronic device according to an embodiment of this application.

As shown in FIG. 16, some other embodiments of this application further provide an electronic device. The electronic device may include one or more processors 1601, a memory 1602, a display 1603, a camera 1604, and one or more computer programs 1605, where the display 1603 is provided with a through hole, and the camera 1604 is embedded in the through hole. The foregoing components may be connected by one or more communications buses 1606.

The one or more computer programs 1605 are stored in the memory 1602 and are configured to be executed by the one or more processors 1601. The one or more computer programs 1605 may include instructions, where the instructions may be used to perform steps in FIG. 4 and a corresponding embodiment. In some other embodiments of this application, the instructions may alternatively be used to perform steps in FIG. 8 and a corresponding embodiment. In some other embodiments of this application, the instructions may alternatively be used to perform steps in FIG. 11 and a corresponding embodiment. Certainly, the electronic device includes but is not limited to the foregoing listed components. For example, the foregoing electronic device may further include a radio frequency circuit, a positioning apparatus, a sensor, and the like. When the electronic device includes another component, the electronic device may be the electronic device shown in FIG. 2.

Some other embodiments of this application further provides a computer storage medium. The computer storage medium stores computer program code. When the electronic device executes the computer program code, the electronic device performs related method steps in FIG. 4 or FIG. 8, to implement the control method in the foregoing embodiments. Alternatively, when the electronic device executes the computer program code, the electronic device performs related method steps in FIG. 11, to implement the screenshot generating method in the foregoing embodiments.

Some other embodiments of this application further provides a computer program product. When the computer program product is run on a computer, the computer is enabled to perform related method steps in FIG. 4 or FIG. 8, to implement the control method in the foregoing embodiments. Alternatively, when the computer program product is run on a computer, the computer is enabled to perform related method steps in FIG. 11, to implement the screenshot generating method in the foregoing embodiments.

Some other embodiments of this application further provides a control device. The control device includes a processor and a memory. The memory is configured to store computer program code. The computer program code includes a computer instruction. When the processor executes the computer instruction, the control device performs related method steps in FIG. 4 or FIG. 8, to implement the control method in the foregoing embodiments. Alternatively, when the processor executes the computer instruction, the control device performs related method steps in FIG. 11, to implement the screenshot generating method in the foregoing embodiments. The control device may be an integrated circuit IC, or may be a system on chip SOC. The integrated circuit may be a universal integrated circuit, or may be a field programmable gate array FPGA, or may be an application-specific integrated circuit ASIC.

Some other embodiments of this application further provide an apparatus. The apparatus has a function of implementing behavior of the electronic device in the foregoing method. The function may be implemented by using hardware, or may be implemented by using hardware executing corresponding software. The hardware or the software includes one or more modules corresponding to the foregoing functions.

The electronic device, the computer storage medium, the computer program product, the control device, or the apparatus provided in the embodiments of this application is configured to perform the corresponding method provided above. Therefore, for beneficial effects that can be achieved by the electronic device, the computer storage medium, the computer program product, the control device, or the apparatus, refer to beneficial effects of the corresponding method provided above, and details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a Hash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fail within the protection scope of the embodiments of this application. Therefore, the protection scope of the embodiments of this application shall be subject to the protection scope of the claims.

What is claimed is:

1. An electronic device comprising:
a memory configured to store instructions;
a display comprising a through hole;
a camera embedded in the through hole; and
a processor coupled to the memory, the display, and the camera, wherein the instructions cause the processor to be configured to:
display a home screen comprising a first icon of a first application program on the display;
receive a first operation from a user on the first icon;
display, in response to the first operation, a first interface of the first application program on the display;
receive a screen capturing operation from the user;
draw, in response to the screen capturing operation, a first screenshot of the first interface;
add a first image corresponding to the first application program to a first position in the first screenshot corresponding to the through hole; and
display the first screenshot comprising the first image.

2. The electronic device of claim 1, wherein the home screen further comprises a second icon of a second application program, and wherein the instructions further cause the processor to be configured to:
receive a second operation from the user on the second icon;
display, in response to the second operation, a second interface of the second application program on the display;
receive the screen capturing operation from the user;
draw, in response to the screen capturing operation, a second screenshot of the second interface;
add a second image corresponding to the second application program to a second position in the second screenshot corresponding to the through hole; and
display the second screenshot comprising the second image.

3. An electronic device comprising:
a memory configured to store instructions;
a display comprising a through hole;
a camera embedded in the through hole; and
a processor coupled to the memory, the display, and the camera, wherein the instructions cause the processor to be configured to:
display, on the display, a first interface comprising a first interface element, wherein a first display position of the first interface element encircles the through hole;
receive a first operation from a user;
display, on the display in response to the first operation, a second interface comprising the first interface element, wherein the second interface is of a first application program;
receive, from the user, a second operation of enabling a first mode of the first application program;
enable, in response to the second operation, the first mode; and
display, on the second interface, a second interface element and skip displaying the first interface element, wherein the second interface element comprises first prompt information prompting that the first mode is enabled, wherein a second display position of the second interface element encircles the through hole, and wherein a second display area of the second interface element is greater than a first display area of the first interface element.

4. The electronic device of claim 3, wherein the first application program is a camera, and wherein the first mode is a photographing mode of the camera.

5. The electronic device of claim 3, wherein the instructions further cause the processor to be configured to change, based on a scene transition effect, the first interface element displayed in the second interface to the second interface element.

6. The electronic device of claim 3, wherein the instructions further cause the processor to be configured to:
receive, from the user, a third operation of making a phone call;
display, on the display in response to the third operation, a call interface comprising the first interface element;
receive, from the user, a fourth operation; and
display, on the display in response to the fourth operation, a third interface that is different from the call interface, wherein the third interface comprises a third interface element, wherein the third interface element comprises second prompt information prompting that the electronic device is currently in a call, wherein a third display position of the third interface element encircles the through hole, and wherein a third display area of the third interface element is greater than the first display area.

7. The electronic device of claim 6, wherein the third interface is a home screen, and wherein the third interface element is in a status bar of the third interface.

8. The electronic device of claim 3, wherein the first interface element and the second interface element are in a status bar.

9. The electronic device of claim 3, wherein after displaying the first interface, the instructions further cause the processor to be configured to:
receive a screen capturing operation from the user;
draw, in response to the screen capturing operation, a screenshot of the first interface;
add a watermark to a position in the screenshot corresponding to the through hole; and
display the screenshot comprising the watermark.

10. The electronic device of claim 3, wherein after enabling the first mode, displaying the second interface element, and skipping displaying the first interface element, the instructions further cause the processor to be configured to:
receive, from the user, a screen capturing operation;
draw, in response to the screen capturing operation, a screenshot of the second interface;
add an image corresponding to the first application program to a position in the screenshot corresponding to the through hole; and
display the screenshot comprising the image.

11. An electronic device comprising:
a memory configured to store instructions;
a display comprising a through hole;
a camera embedded in the through hole; and
a processor coupled to the memory, the display, and the camera, wherein the instructions cause the processor to be configured to:
display, on the display, a first interface comprising a first interface element, wherein a first display position of the first interface element encircles the through hole;
receive, from a user, a first operation of making a phone call;
display, on the display in response to the first operation, a call interface comprising the first interface element;
receive, from the user, a second operation; and
display, on the display in response to the second operation, a second interface that is different from the call interface, wherein the second interface comprises a second interface element, wherein the second interface element comprises prompt information prompting that the electronic device is currently in a call or prompt call duration, wherein a second display position of the second interface element encircles the through hole, and wherein a second display area of the second interface element is greater than a first display area of the first interface element.

12. The electronic device of claim 11, wherein the second interface is a home screen, and wherein the first interface element and the second interface element are in a status bar.

13. The electronic device of claim 11, wherein after displaying the second interface, the instructions further cause the processor to be configured to:
receive, from the user, a screen capturing operation;
draw, in response to the screen capturing operation, a screenshot of the second interface;
add an image corresponding to a phone to a position in the screenshot corresponding to the through hole; and
display the screenshot comprising the image corresponding to the phone.

14. The electronic device of claim 11, wherein the second interface is an interface of an application program, and wherein the first interface element and the second interface element are in a status bar.

15. The electronic device of claim 3, wherein the first application program is a camera, and wherein the first mode is a video recording mode of the camera.

16. The electronic device of claim 3, wherein the first application program is a camera, and wherein the first mode is a scene mode of the camera.

17. The electronic device of claim 6, wherein the third interface is an interface of an application program, and wherein the third interface element is in a status bar of the third interface.

18. The electronic device of claim 3, wherein the instructions further cause the processor to be configured to:
receive, from the user, a third operation of making a phone call;
display, on the display in response to the third operation, a call interface comprising the first interface element;
receive, from the user, a fourth operation; and
display, on the display in response to the fourth operation, a third interface that is different from the call interface, wherein the third interface comprises a third interface element, wherein the third interface element comprises second prompt information prompting a call duration, wherein a third display position of the third interface element encircles the through hole, and wherein a third display area of the third interface element is greater than the first display area.

19. The electronic device of claim 18, wherein the third interface is a home screen, and wherein the third interface element is in a status bar of the third interface.

20. The electronic device of claim 18, wherein the third interface is an interface of an application program, and wherein the third interface element is in a status bar of the third interface.

* * * * *